(12) United States Patent  (10) Patent No.: US 9,038,360 B1
Moreau et al.  (45) Date of Patent: May 26, 2015

(54) SHACKLE ASSEMBLY WITH LOCKING PIN

(71) Applicant: Ty-Flot, Inc., Manchester, NH (US)

(72) Inventors: Darrell A. Moreau, Manchester, NH (US); Andre W. Moreau, Bedford, NH (US)

(73) Assignee: Ty-Flot, Inc., Manchester, NH (US)

( * ) Notice: Subject to any disclaimer, the term of this patent is extended or adjusted under 35 U.S.C. 154(b) by 0 days.

(21) Appl. No.: 14/593,175

(22) Filed: Jan. 9, 2015

Related U.S. Application Data

(63) Continuation-in-part of application No. 13/754,061, filed on Jan. 30, 2013.

(51) Int. Cl.
    *F16G 15/06* (2006.01)

(52) U.S. Cl.
    CPC ....................... *F16G 15/06* (2013.01)

(58) Field of Classification Search
    CPC ................... F16G 15/04; F16G 15/06
    USPC ................ 59/78, 84, 85, 86, 87, 93
    See application file for complete search history.

(56) References Cited

U.S. PATENT DOCUMENTS

| | | | | |
|---|---|---|---|---|
| 809,511 A | * | 1/1906 | Lien | 59/86 |
| 1,253,971 A | * | 1/1918 | Hipsher | 59/95 |
| 1,646,546 A | * | 10/1927 | Larsen | 59/86 |
| 2,010,853 A | * | 8/1935 | Dyer | 59/86 |
| 2,097,465 A | * | 11/1937 | Morrison | 59/86 |
| 2,369,344 A | * | 2/1945 | Ehmann | 59/86 |
| 3,274,879 A | * | 9/1966 | Poller | 411/351 |
| 3,453,822 A | * | 7/1969 | Crook, Jr. | 59/85 |
| 3,994,127 A | * | 11/1976 | Gower | 59/85 |
| 4,094,141 A | * | 6/1978 | Rehbein | 59/93 |
| 4,095,416 A | * | 6/1978 | Issard | 59/86 |
| 4,102,124 A | * | 7/1978 | Swager | 59/86 |
| 4,274,252 A | * | 6/1981 | Cavender | 59/86 |
| 5,433,547 A | * | 7/1995 | Hart et al. | 59/86 |
| 5,460,418 A | * | 10/1995 | Falls | 59/86 |
| 7,155,895 B2 | * | 1/2007 | Moehnke et al. | 59/84 |
| 7,393,033 B1 | * | 7/2008 | Bisso, IV | 59/86 |
| 7,540,140 B1 | * | 6/2009 | Diaz et al. | 59/86 |
| 7,614,209 B1 | * | 11/2009 | Payne et al. | 59/86 |
| 2008/0245049 A1 | * | 10/2008 | Pengg | 59/86 |
| 2011/0265442 A1 | * | 11/2011 | Segura | 59/86 |

* cited by examiner

*Primary Examiner* — David B Jones
(74) *Attorney, Agent, or Firm* — Mesmer & Deleault PLLC

(57) ABSTRACT

A combination includes a shackle with a pin and a locking ring. The shackle body has a closed geometry defining a primary opening therethrough and includes a first side member with a first aperture, a second side member spaced apart from the first side member and having a second aperture. The second aperture is positioned opposite from and aligned with the first aperture. End portions extend between and connect the first side member and the second side member. A pin has a body portion extending between a head portion and a tip portion. The pin defines an annular slot extending at least partially around the pin. An expandable retaining ring is configured to be installed on the pin and occupy the annular slot, where the retaining ring prevents removal of the pin from the shackle body when the pin is installed in the shackle body.

17 Claims, 14 Drawing Sheets

Fig. 2A
Fig. 2B
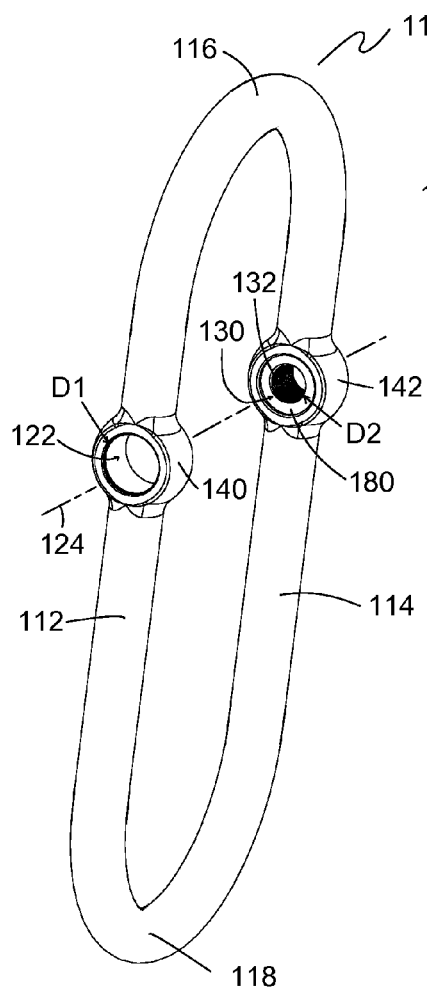
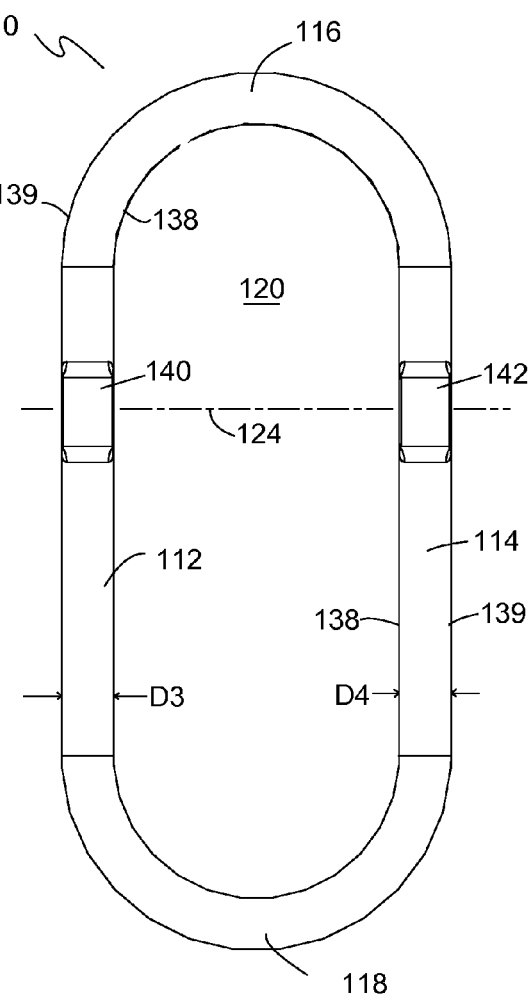

SHACKLE ASSEMBLY WITH LOCKING PIN

BACKGROUND OF THE INVENTION

1. Field of the Invention

The present invention relates locking fasteners and shackle assemblies. More particularly, the present invention relates to a fastener with a locking ring and use of the fastener in a shackle assembly.

2. Description of the Prior Art

Traditionally, a shackle has a U-shaped metal bracket (also known as a clevis) with two arms. The ends of the two arms span an opening between them, which is closed with a bolt or clevis pin inserted through openings in the ends of the arms. Shackles are commonly used to connect multiple items together or secure items to a chain or rope. In some cases, the user loops one end of a strap around the clevis or clevis pin with the other end of the strap being secured to a fixed object. Similar to a bolt, one end of the clevis pin often has an enlarged head or cap that prevents the pin from passing completely through openings in the clevis arms. The opposite end of the clevis pin has a hole passing transversely through the pin's end. A clevis pin may be held in place by inserting a cotter pin or other retaining device through the hole in the end of the clevis pin, thereby preventing the clevis pin from passing through the holes in the clevis. In other shackles, the clevis pin is secured by nuts screwed onto one or both ends of a threaded clevis pin. In yet other designs, the clevis pin is retained by a retaining ring (e.g., an E-ring) placed around a recess or groove in the end of the clevis pin.

A related device, known as a hammerlock link, is useful to connect two closed loops, such as chain links. A hammerlock link has two U-shaped metal pieces connected together at the ends of each arm of the U-shaped pieces. Each U-shaped piece has an open end defined by a pair of arms forming the U shape. Each arm of the U-shaped piece has an opening passing transversely through the end of the arm, much like a clevis. The openings in the ends of the arms of both U-shaped pieces are aligned and connected together with a pin that inserts through the openings. The pin in some hammerlock links is held in place by placing a split sleeve over a middle portion of the pin positioned between the U arms of each U-shaped piece. The outer diameter of the split sleeve is larger than the openings in the arms and therefore prevents the pin from sliding out through these openings.

With both a hammerlock link and with a clevis, the user assembles a pin through a U-shaped piece to form a closed loop and retains the pin in place with fasteners or additional parts as described above.

SUMMARY OF THE INVENTION

The above-mentioned devices have been used for years, but remain bulky for use with small hand-held objects such as hand tools. Additionally, retaining or securing the pin to these devices is often done with questionable integrity. Threaded nuts come unscrewed from ends of a pin, even when a nut has a locking insert. For example, a locking nylon insert of a lock nut may become worn or otherwise fail to lock the nut in place, thereby allowing the nut to loosen and fall off. Cotter pins, retaining rings, and nuts can be sheared off or broken since they remain exposed at the outside of the shackle and are relatively light duty objects. A split sleeve used over pins in hammerlock shackles may similarly catch on objects along the split, thereby damaging or opening the sleeve to allow the hammerlock link to open. Further, a split sleeve is difficult to install without proper tools designed for such installation.

In some cases, failure of the device is a minor inconvenience. In other cases, a shackle failure can waste valuable time and resources, cause injury and damage due to dropped objects becoming separated from a tether, increase operating costs by necessitating replacement parts and repairs, and introduce foreign material to industrial systems that contaminates a system or requires shut down of the system to retrieve the foreign object. Therefore, to overcome limitations of existing devices, a need exists for an improved shackle, such as a shackle assembly with a locking pin.

It is an object of the present invention to provide a shackle assembly that reinforces safety.

It is another object of the present invention to provide improved performance over existing connectors.

It is another object of the present invention to provide a shackle assembly that reduces operating costs.

It is another object of the present invention to improve the reliability of shackle connectors.

The present invention achieves these and other objectives by providing a shackle assembly with a body and pin that is retained or locked with the body. In one embodiment, a shackle assembly has a unitary rigid body that defines a structure with a closed geometry and with a primary opening therethrough. The body includes a first side member with a first side aperture extending transversely therethrough and having a first inside surface. A second side member is spaced apart from the first side member and has a second side aperture extending transversely at least partially through the second side member. The second side aperture is positioned opposite the first side aperture and axially aligned with the first side aperture. End portions extend between and connect the first and second side members. A pin has a central longitudinal axis. A head portion of the pin can be positioned at least partially within the first side aperture. A tip portion of the pin can be positioned at least partially within the second side aperture. A pin body extends between the head portion and the tip portion along a central longitudinal axis, where the pin body is sized to pass through the first side aperture.

The closed geometry of the body may be a loop, a ring, an oval, a triangle, a trapezoid, and a rectangle. The first and second side members may be substantially parallel, but do not have to be parallel as would be the case where the first and second side members are the sides of a triangular or trapezoidal body.

In another embodiment of the shackle assembly, the head portion of the pin includes a collet element with an end-facing surface, an outside surface, and a plurality of collar segments disposed around an open region. The collet element can be positioned at least partially within the first side aperture. The collet element is compressible to a smaller diameter in response to engagement with the first inside surface of the first side aperture, such as when the pin is advanced through the first side aperture.

In another embodiment, the collet element has one or more kerf cuts that extend through the collet element at an angle transverse to the central longitudinal axis. The kerf cut defines an inwardly sloped face on one of the plurality of collar segments and an outwardly sloped face on an adjacent collar segments opposite of the kerf cut. A tip on the inwardly sloped face has a tip outside radius that is greater than an outside surface radius at the outwardly sloped face. The tip being radially compressible to reduce the tip outside radius and the tip is configured to engage the first inside surface of the first side aperture to prevent the pin from being removed from the body.

In another embodiment, the first side member also has a catch surface extending into the first side aperture where the end-facing surface can engage the catch surface to prevent the pin from being removed from the body.

In another embodiment, the head portion of the pin includes an outside surface with a sloped region of increasing diameter. The first side member also includes a collet member with plurality of collet member segments disposed around the first side aperture. The collet member can expand in response to engagement with the outside surface of the head portion of the pin. In use, as the sloped region is advanced through the first side aperture, the sloped region of increasing diameter engages the collet member, gradually expanding the opening of the collet member.

In another embodiment, the collet member also has a rim with a catch surface extending into the first side aperture, where the head portion of the pin has an end-facing surface configured to engage the catch surface to prevent the pin from being removed from the body.

In another embodiment of the shackle assembly, the second side aperture has a larger opening portion, a smaller opening portion, and a catch surface defined by an interface between the larger opening portion and the smaller opening portion. The tip portion of the pin has at least one locking pin biased to extend from the tip portion into the larger opening portion and configured to engage the catch surface.

In yet another embodiment, the shackle assembly has a second body member. The second body member includes a first longitudinal portion with a first proximal end, a first distal end, and a first opening through the first proximal end of the first longitudinal portion. It also has a second longitudinal portion with a second proximal end, a second distal end, and a second opening through the second proximal end of the second longitudinal portion. An end portion extends between and connects the first distal end of the first longitudinal portion and the second distal end of the second longitudinal portion. The pin extends through the first opening and the second opening of the second body member.

In another embodiment, the shackle assembly includes a body having a first side portion with a first opening extending through the first side portion. The first opening has a first inside surface. A second side portion is spaced from the first side portion and has a second opening extending at least partially through the second side portion and axially aligned with the first opening. The body has at least one end portion extending between the first side portion and the second side portion. The body has a first retaining structure.

A pin with a central longitudinal axis has a head portion disposed at least partially within the first opening of the body. A tip portion is disposed at least partially within the second opening. A pin body extends between the head portion and the tip portion along the central longitudinal axis and is sized to pass through the first opening. A second retaining structure on the pin is configured to engage the first retaining structure on the body.

Examples of the first retaining structure include (i) the inside surface of the first side aperture, (ii) a rim with a catch surface extending into the first or second opening; (iii) a collet member having a plurality of collet member segments disposed around the first opening, the collet member capable of expanding in response to engagement with the head portion of the pin, and (iv) a stop surface defined by an interface between a larger opening portion and a smaller opening portion of one of the first opening and the second opening.

Examples of the second retaining structure include (1) the head portion having a collet element with a plurality of collar segments disposed around an open region and compressible to a smaller diameter in response to engagement with the inside surface of the first or second opening, (2) the head portion having an end-facing surface configured to engage the catch surface to prevent the pin from being removed from the body, (3) the head portion having an outside surface with a sloped region of increasing diameter, (4) at least one locking pin biased to extend from the tip portion into the larger opening portion and configured to engage the stop surface on the body, and (5) the head portion having a collet element with an outside surface and having at least one kerf cut extending through the collet element at an angle transverse to the central longitudinal axis, where the kerf cut(s) defines an outwardly sloped face and an inwardly sloped face with a tip. The tip has a tip outside radius that is greater than an outside surface radius at the outwardly sloped face. The tip is radially compressible to reduce the tip outside radius by engaging the first inside surface of the first opening.

In another embodiment, the shackle assembly is a kit with the body, the pin, and instructions for advancing the pin through the first opening and into the second opening to retain the pin.

In another embodiment of the present invention, a fastener has a body portion extending along a central longitudinal axis with a first end and a second end. An annular sleeve has an outside surface and encloses an open region. The sleeve has a plurality of sleeve segments extending from the first end substantially parallel to the central longitudinal axis with each of the plurality of sleeve segments disposed radially outward of the central longitudinal axis and of the open region. The annular sleeve is capable of changing between a first outside diameter and a smaller second outside diameter in response to a force applied to the plurality of sleeve segments.

In another embodiment of the fastener, the outside surface of the sleeve portion tapers between a first radius and a second radius smaller than the first radius. In another embodiment of the fattener, the plurality of sleeve segments are separated by a kerf cut through the sleeve at an angle transverse to the central longitudinal axis, where the one kerf cut(s) each define an outwardly sloped face with a tip portion and an inwardly sloped face. The tip portion has an outside radius greater than the outside surface at the outwardly sloped face. In one embodiment, the angle is between fifteen and seventy five degrees with respect to the central longitudinal axis.

Another aspect of the invention is directed to a combination of a shackle with a pin and a locking ring. In one embodiment, the shackle has shackle body with a closed geometry defining a primary opening therethrough. The shackle body has a first side member with a first side aperture extending transversely therethrough, a second side member spaced apart from the first side member and having a second side aperture extending transversely at least partially through the second side member. The second side aperture is positioned opposite the first side aperture and axially aligned with the first side aperture. End portions extend between and connect the first side member and the second side member. In one embodiment, the shackle body has an oval shape.

A pin has a body portion longitudinally extending between a head portion and a tip portion, where the tip portion is sized to be received in the second side aperture and the head portion is sized to be received in the first side aperture. The pin defines an annular slot extending at least partially around the pin. An expandable retaining ring is configured to be installed on the pin and occupy the annular slot. The expandable retaining ring engages the pin and the shackle body to prevent removal of the pin from the shackle body when the pin is installed in the shackle body with the expandable retaining ring occupying the annular slot.

In another embodiment, the annular slot of the pin is a tip slot extending at least partially around the tip portion, where the tip slot defines a flange located between the tip end and the tip slot. The flange protrudes radially about the longitudinal axis from the tip portion and has a flange outer diameter greater than the slot diameter, but no greater than the tip diameter. The tip slot and the flange extend through the second side aperture when the pin is installed in the shackle body. In one such embodiment, the tip portion defines a plurality of threads on the tip portion between the body portion and the tip slot, wherein the tip diameter is a major thread diameter. In another such embodiment, the flange outer diameter is substantially equal to a minor thread diameter of the plurality of threads.

In another embodiment, the annular slot is a tip slot extending at least partially around the tip portion. The second side aperture defines a recess having at least one recess wall located between an inside body surface and an outside body surface of the second side member. The expandable retaining ring is constructed to be installed in the tip slot and positioned to engage the recess wall(s) to prevent removal of the pin from the shackle body when the pin is installed in the shackle body with the tip portion received in the second side aperture and the head portion is received in the first side aperture.

In yet another embodiment, the annular slot is a body slot extending at least partially around the body portion, where the body slot is adjacent an inside body surface of the first side member when the pin is installed in the shackle body with the tip portion received in the second side aperture and the head portion is received in the first side aperture.

In another embodiment of the pin, a pin body portion extends longitudinally between a head portion and a tip portion, where the head portion defines an annular head slot with a slot diameter. The annular head slot may extend partially or completely around the circumference of the head portion. The pin body is sized to be received through the first side aperture with the tip portion received in the second side aperture. An expandable retaining ring is sized and configured for installation on the pin and for being received in the annular head slot. When the pin is installed in the rigid shackle body with the tip portion received in the second side aperture and the head received in the first side aperture, and the retaining ring is installed on the pin in the annular head slot, the retaining ring is positioned to engage the recess wall to prevent removal of the pin.

In another embodiment, the first side aperture of the shackle defines a sloped entrance face between the outside body surface and the first opening recess.

In another embodiment, the second side aperture of the shackle and the tip portion of the pin are threaded.

In one embodiment, the first opening recess is an annular groove in an inside surface of the first side aperture.

Another aspect of the present invention relates to a fastener for use with a locking or retaining ring. The fastener has a pin body portion extending longitudinally between a head portion and a tip portion, the tip portion having a tip end and a tip diameter. The fastener defines at least one of (i) a body slot in the pin body portion and having a slot diameter less than a pin body diameter, where the annular body slot is spaced from the head portion, (ii) a tip slot adjacent in the tip portion and defining a flange adjacent the tip end wherein the flange has a flange outer diameter greater than a tip slot diameter and no greater than the tip diameter, and/or (iii) a head slot in the head portion.

In another embodiment, the fastener includes an expandable locking ring having an inner diameter sized for installation on the body slot, the tip slot, or the head slot, where when installed on the tip slot, the body slot, or the head slot, the expandable locking ring extends radially beyond the pin body diameter.

In another embodiment, the fastener defines a tip slot and the tip portion further defines a plurality of threads between the tip slot and the pin body portion, where the tip diameter is a minor thread diameter.

In another embodiment, the flange outer diameter is substantially equal to a minor thread diameter of the plurality of threads.

In another embodiment, the body slot, the tip slot, and/or the head slot is (are) an annular groove, two or more recesses arranged circumferentially or two or more flats arranged circumferentially.

In another embodiment, the fastener also defines an additional body slot in the pin body portion having an additional body slot diameter smaller than the pin body diameter, where the additional body slot is positioned adjacent the tip portion.

In another embodiment, the pin body portion defines two or more slots distributed axially along the body portion.

BRIEF DESCRIPTION OF THE DRAWINGS

FIG. 1A illustrates a front perspective view of one embodiment of the present invention showing a shackle assembly with a unitary body and a pin.

FIG. 1B illustrates a rear perspective view of the embodiment of FIG. 1a.

FIG. 2A illustrates a front perspective view of the body of FIG. 1a showing a threaded pin-receiving second opening.

FIG. 2B illustrates a front elevation of the body of FIG. 2a.

FIG. 12B illustrates an enlarged view of the head portion of the pin of FIG. 12a.

FIG. 12D illustrates and end view of the locking head of the pin of FIG. 12a.

DETAILED DESCRIPTION OF THE PREFERRED EMBODIMENT

Figures 1A, 1B:
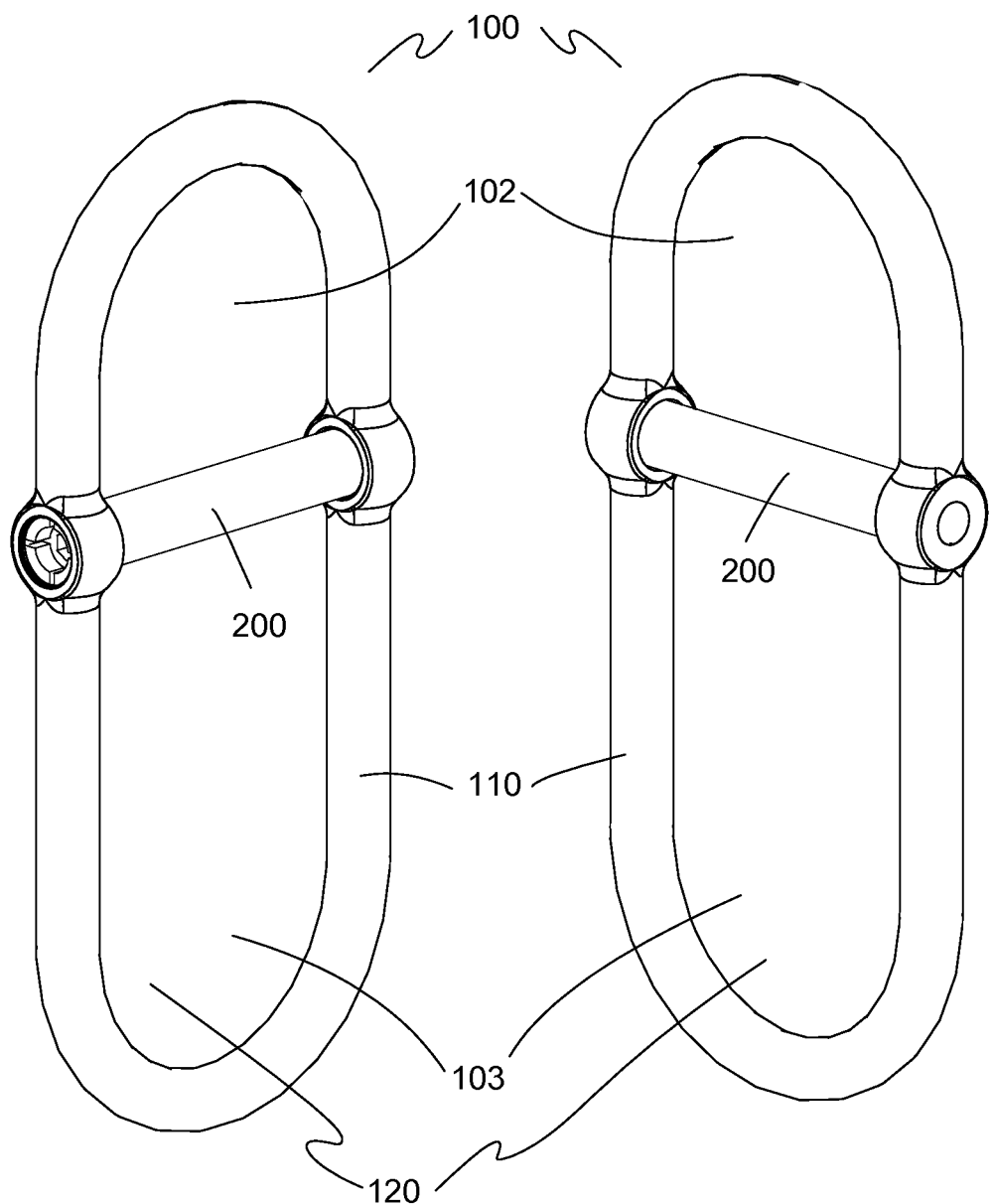

The preferred embodiments of a shackle assembly 100 of the present invention are illustrated in FIGS. 1-20. FIGS. 1A and 1B illustrate front and rear perspective views, respectively, of one embodiment of a shackle assembly 100 having a body 110 and a pin 200. Body 100 in this embodiment defines a closed oval shape. Pin 110 passes transversely through body 110, dividing a primary opening 120 into two smaller openings 102, 103.

Referring now to FIGS. 2A and 2B, perspective and front views, respectively, illustrate the embodiment of body 110 as shown in FIG. 1. In one embodiment, body 110 has a longitudinal first side portion 112, a longitudinal second side portion 114 spaced apart from and extending substantially parallel to first side portion 112, a first end portion 116, and a second end portion 118 opposite first end portion 116. Body 110 has an inside body surface 138 and an outside body surface 139. First and second end portions 116, 118 each connect between longitudinal first and second side portions 112, 114 to define a closed oval shape that encloses a primary opening 120. Body 110 is unitary and rigid, preferably with a closed geometry. Body 110 is made of metal, plastics, or other materials, depending on the desired strength, corrosion resistance, weight, and other properties required for the intended use. Preferably, body 110 is made of stainless steel or spring steel. Other shapes are also acceptable, including a ring, an oval, a loop, a triangle, a trapezoid, and a rectangle. First side portion 112 and second side portion 114 need not be parallel. In another embodiment, body 110 lacks second end portion 118 and has an open geometry, such as a U-shape, E-shape (with third side portion), or the like. In such an embodiment, pin 200 inserts through openings in ends of first side portion 112 and second side portion 114 that define the U-shape or E-shape to close the otherwise open geometry of body 112.

A first aperture or opening 122 passes transversely through first side portion 112 along a transverse axis 124 extending substantially perpendicular to first and second longitudinal portions 112, 114. First opening 122 is preferably a circular bore through first side portion 112 with a predefined diameter D1. In one embodiment, transverse axis 124 passes through midpoints of first and second longitudinal portions 112, 114. In other embodiments, transverse axis 124 is positioned closer to either first end portion 116 or second end portion 118.

A second aperture or opening 130 passes transversely through second side portion 114, also along transverse axis 124 and axially aligned with first opening 122. In one embodiment, second opening 130 is a through-opening with a second predefined diameter D2. In other embodiments, second opening 130 extends partially into second side portion 114. In one embodiment, diameter D2 of second opening 130 is smaller than diameter D1 of first opening 130. Optionally, second opening 130 is threaded with machine threads 132 for receiving pin 200 with mating threads. Optionally, a recessed region 180 is formed in inside body surface 138 around second opening 130 to accept a shoulder 254 of pin 200.

In one embodiment of body 110, one or both of first and second side portions 112, 114 has a hub 140, 142, respectively, that enables first opening 112 and/or second opening 130 to have a larger diameter D1, D2. Such a configuration is useful when pin 200 has a body diameter D8 that is approximately equal to a diameter D3, D4 of first and second longitudinal portions 112, 114, respectively. Hubs 140, 142 would not be necessary, for example, when diameter D8 of pin 200 is smaller than diameters D3, D4 of first and second side portions 112, 114, respectively, or when first and second side portions 112, 114 are sufficiently large to accommodate first opening 122 and/or second opening 130 without hubs 140, 142. Diameters D3, D4 are preferably equal, but may differ. Hubs 140, 142 are substantially spherical in one embodiment. In another embodiment, hubs 140, 142 extend radially outward from first opening 122 and/or second opening 130. Thus, hubs 140, 142 occupy regions that are perpendicular to transverse axis 124 and that include first and second side portions 112, 114, respectively.

Figure 3A:
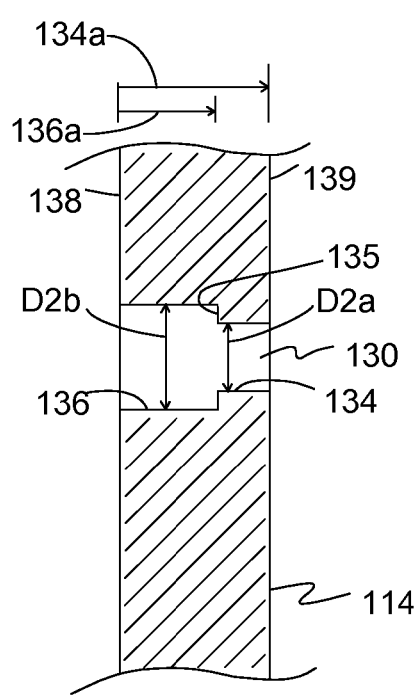
FIG. 3A illustrates a cross-sectional view of another embodiment of the pin-receiving opening showing a larger portion facing an inside of the shackle body and a smaller portion.
Figure 3B:
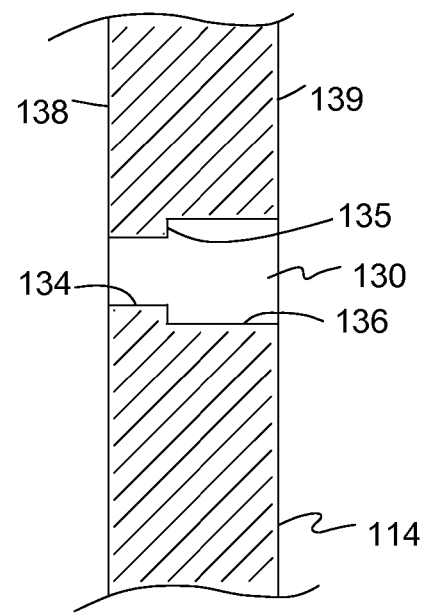
FIG. 3B illustrates a cross-sectional view of another embodiment of the pin-receiving opening showing a smaller portion facing an inside of the shackle body.

Referring now to FIG. 3A-3B, cross-sectional views of alternate embodiments of body 110 show second opening 130 formed as a two-part opening with a smaller opening portion 134 with diameter D2a and a larger opening portion 136 with diameter D2b. As shown in FIG. 3A, a larger opening portion 136 faces inside body surface 138 and a smaller opening portion 134 faces outside body surface 139. Smaller opening portion 134 in one embodiment extends a first distance 134a from inside body surface 138 into second side portion 114. Larger opening portion 136 extends a second distance 136a from inside body surface 138 into second side portion 114. This embodiment of second opening 130 accepts a pin 200 with a tip having a larger portion and a smaller portion. Interface 135 between smaller opening portion 134 and larger opening portion 136 is a catch/stop surface in second opening 130.

As shown in FIG. 3B, smaller opening portion 134 and larger opening portion 136 may be reversed, where smaller opening portion 134 is positioned towards inside body surface 138 of second side portion 114 and larger opening portion 136 is positioned towards outside body surface 139 of second side portion 114. This configuration may be useful for a pin 200 having ball-lock pins or other locking pins 225. Locking pins 225 expand into larger opening portion 136, engage interface 135, and lock pin 200 in place when pin 200 is inserted into second opening 130.

Figure 3C:
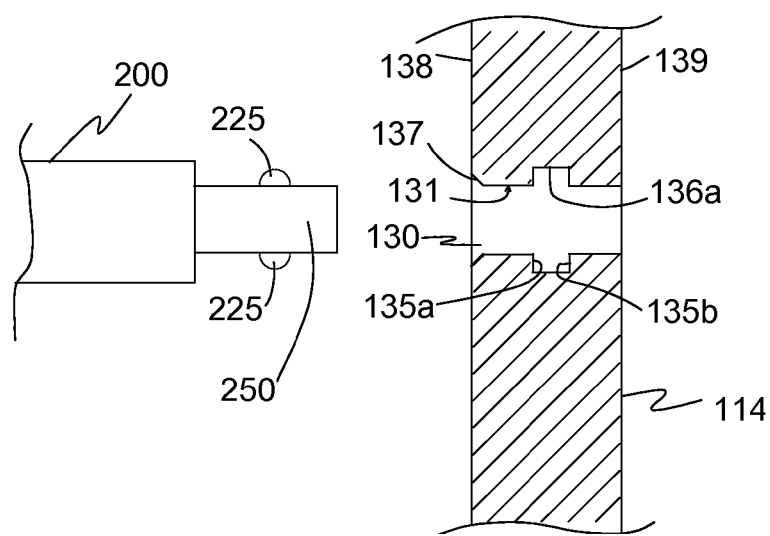
FIG. 3C illustrates a cross-sectional view of another embodiment of the pin-receiving opening showing a recessed portion within the shackle body showing and pin end with a protrusion configured to mate with the recessed portion.

Referring now to FIG. 3C, a cross-sectional view of second side portion 114 shows another embodiment of second opening 130. In this embodiment, a second opening recess 136a, such as a groove or slot, is located is an intermediate portion of second opening 130, preferably about midway between inside body surface 138 and outside body surface 139. Second opening recess 136a in one embodiment extends around the perimeter of second opening 130, such as an annular slot with a rounded or square profile. In other embodiments, second opening recess 136a includes one or more slots that are machined or formed into a portion or portions of inside surface 131 of second opening. Recess walls 135a, 135b define catch and/or stop surfaces within second opening recess 136a.

The embodiment of second opening 130 shown in FIG. 3C is appropriate, for example, with pin 200 having locking pins 225, where locking pins 225 expand out of tip portion 250 into second opening recess 136a. Locking pins 225 engage interfaces 135a, 135b to hold pin 200 in place by restricting movement of pin 200 into or out of second opening 130. Similarly, a retaining ring 400 may be installed in a slot in pin tip 250, where retaining ring 400 occupies the slot and second opening recess 136a to retain pin 200. Optionally, second opening 130 has a chamfered or sloped entrance edge 137 that facilitates entry of pin tip portion 250 into second opening 130 by functionally compressing locking pins 225 into tip portion 250 when inserted into second opening 130.

Figure 4:
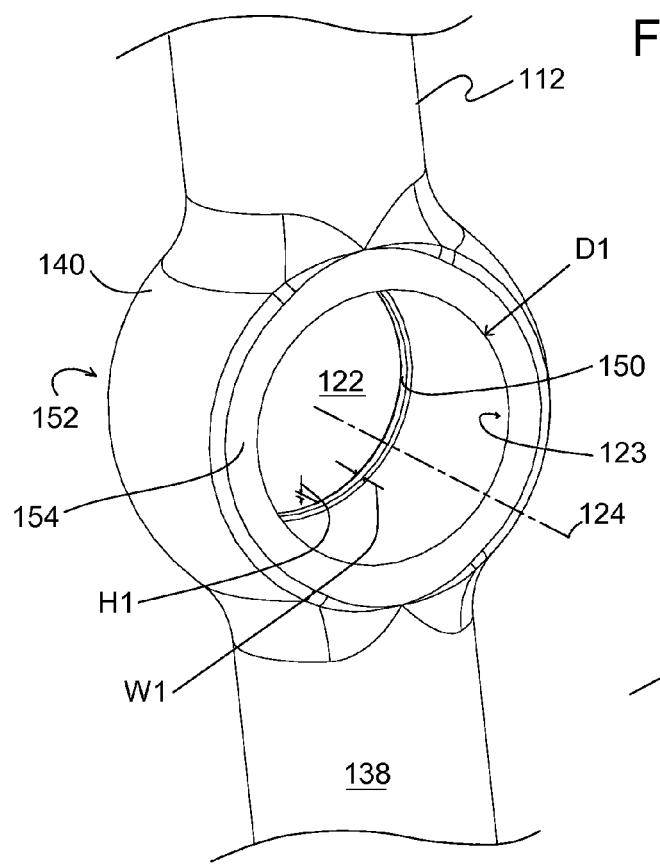
FIG. 4 illustrates perspective view of one embodiment of a pin-receiving first opening showing an opening with a catch surface extending into the first opening as viewed from inside the body.
Figure 5:
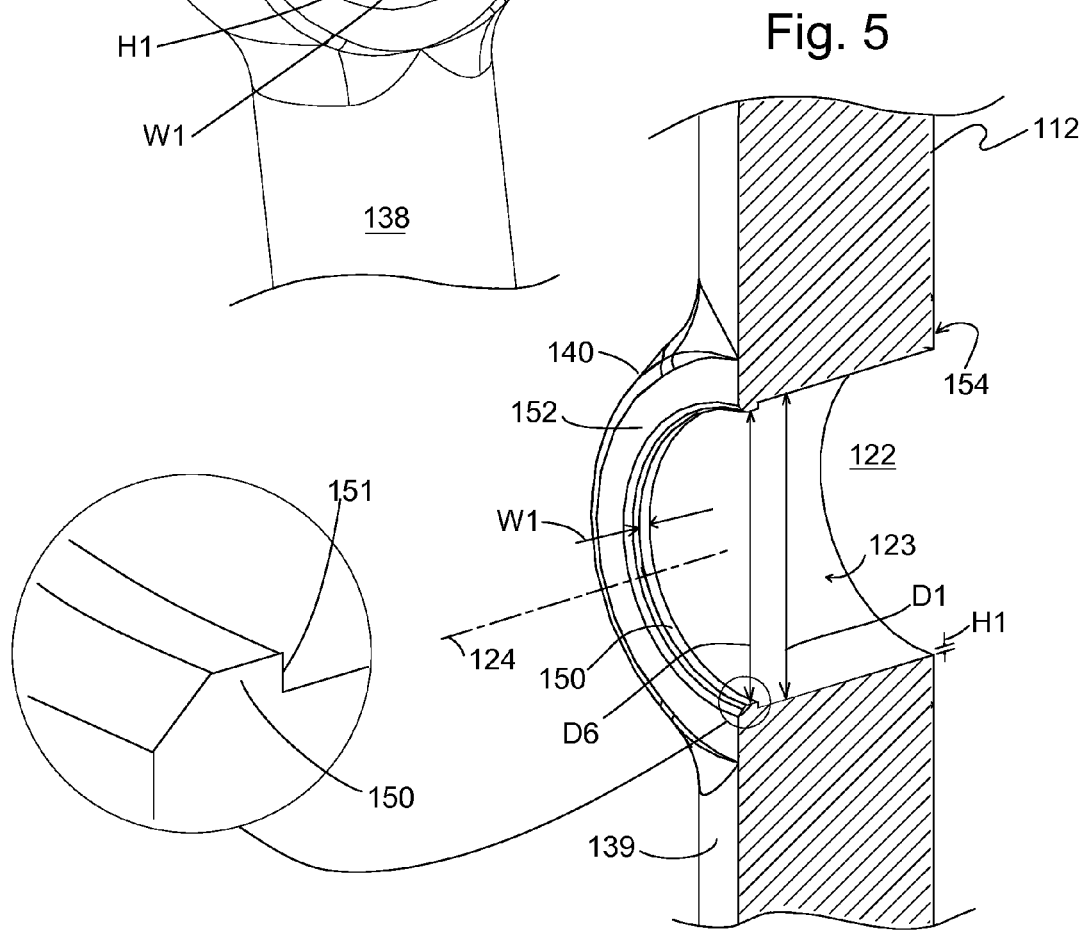
FIG. 5 illustrates a cross-sectional view of the pin-receiving first opening of the body shown in FIG. 4 as viewed from the outside the body.

Referring now to FIGS. 4 and 5, there is shown a portion of one embodiment of first side portion 112 with hub 140 and first opening 122. FIG. 4 shows first opening 122 as viewed from inside body surface 138. FIG. 5 is a cross sectional view of first opening 122 as viewed from beyond outside body surface 139. First opening 122 has an inside surface 123 with a diameter D1 of about 0.35 inch and extending between an outside face 152 and an inside face 154 of hub 140. An optional rim 150 is positioned at or near outside face 152 and extends radially inward from inside surface 123 towards transverse axis 124. Rim 150 has a diameter D6 that is smaller than diameter D1 by about 0.02 inch. In other words, rim 150 extends into first opening 122 by about 0.01 inch. Rim 150 has a width W1 along transverse axis 124 also of about 0.01 inch. As shown in FIG. 5, Rim 150 has an optional chamfered outer edge 156 to facilitate insertion of pin 200. Similar to interface 135 described above, interface 151 is a catch and/or stop surface between an opening of larger diameter (first opening 122) and an opening of smaller diameter (rim 150).

Figure 6:
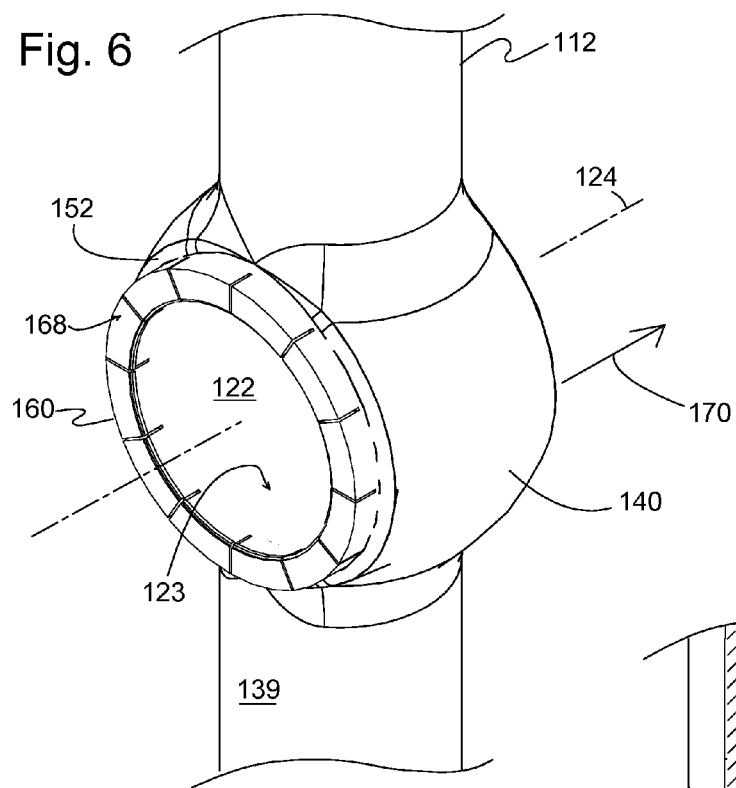
FIG. 6 illustrates a perspective view of another embodiment of the pin-receiving first opening of the body of the present invention showing an opening with a collet member.
Figure 7:
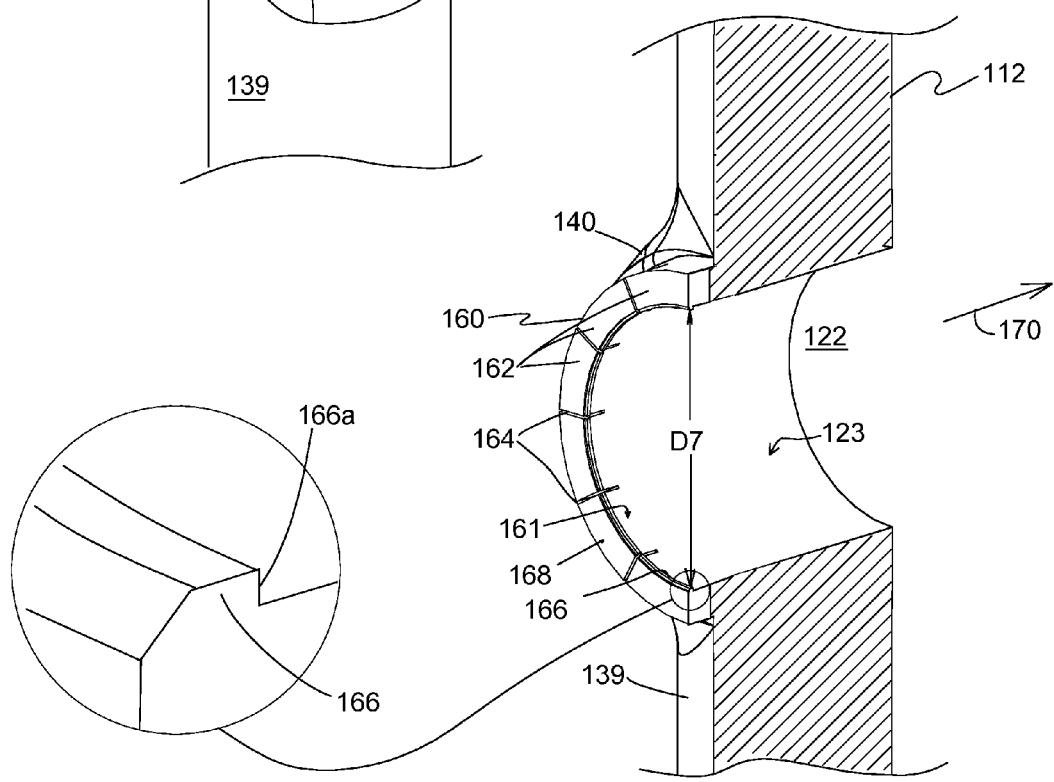
FIG. 7 illustrates a cross-sectional view of the pin-receiving first opening of FIG. 6 showing the inside surface of the opening and collet member.

Referring now to FIGS. 6 and 7, a perspective view and a perspective cross-sectional view, respectively, illustrate another embodiment of a portion of first side portion 112 with hub 140, first opening 122, and a collet member 160. In one embodiment, collet member 160 extends along transverse axis 124 from outside face 152 of hub 140 (or from outside body surface 139) and has a collet member inside surface 161 that is continuous with inside surface 123 of first opening 122. Collet member 160 has a plurality of collet segments 162 separated by kerf cuts 164 radially-oriented towards transverse axis 124. In one embodiment, collet member 160 has from four to twelve collet segments 162 that change between a first opening size and a second opening size to engage or grip pin 200 passing through collet member 160. In some embodiments, the force of collet segments 162 against pin 200 is sufficient to lock pin 200 in place in body 110.

In other embodiment, collet member 160 optionally has a collet rim 166 with interface 166a between collet rim 166 and inside surface 123 of first opening 122. Similar to rim 150, interface 166a defines a catch and/or stop surface by extending radially inward from collet member inside surface 161 or from collet member 160. Collet rim 166 is preferably positioned at or near front face 168 of collet member 160 and functions to engage the end (e.g., head) of a fastener inserted through first opening 122 and having a diameter slightly larger than inside diameter D7 of collet rim 166. As the head of such a fastener (e.g., pin 200) passes through first opening 122 in a direction indicated by an arrow 170, it engages collet rim 166, therefore pushing collet segments 162 outward and slightly expanding inside diameter D7 of collet rim 166 to allow the fastener to pass. As the head of the fastener moves past collet rim 166 in a direction indicated by arrow 170, collet member 160 returns to its previous, unexpanded diameter D7 with interface 166a acting as a catch and/or stop surface to block the fastener from passing back through first opening 122 in the opposite direction. Of course, collet member 160 would function in the same manner for a fastener passing through first opening 122 in a direction opposite to arrow 170.

Figure 8:
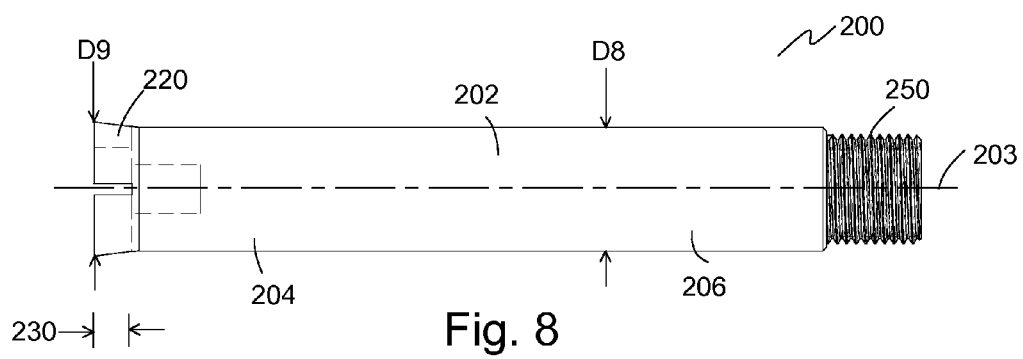
FIG. 8 illustrates side elevation of one embodiment of a pin of the present invention.
Figures 9A, 9B:
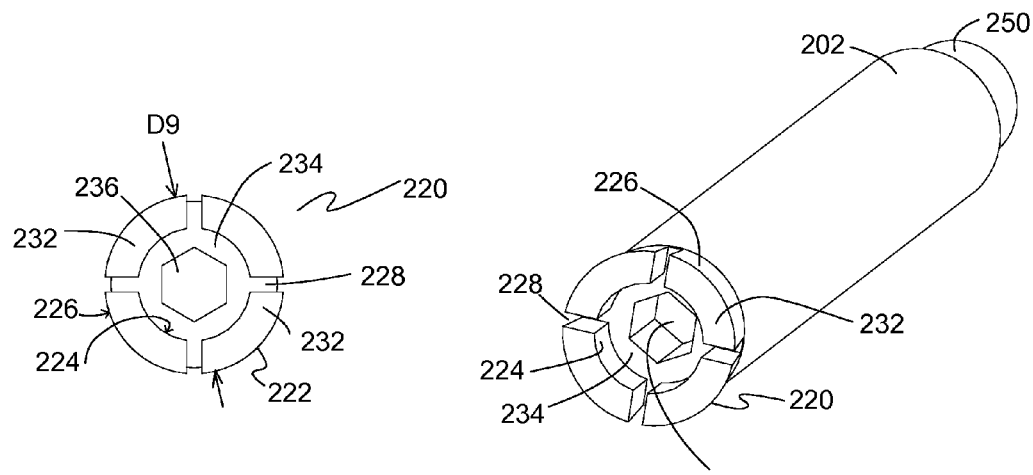
FIG. 9A illustrates an end view of the head portion of the pin of FIG. 8 showing features of a collet element.
FIG. 9B illustrates a perspective view of the head portion of the pin of FIG. 8.
Figure 10:
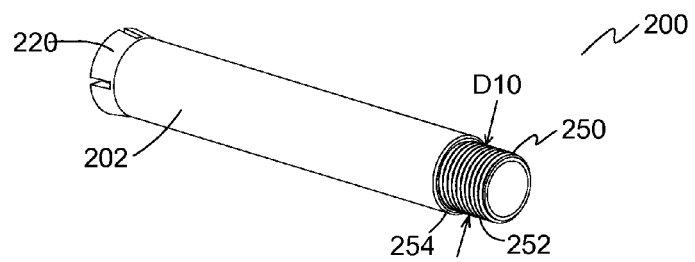
FIG. 10 illustrates a perspective view of the tip portion of the pin of FIG. 8.

Referring now to FIGS. 8-10, various views illustrate one embodiment of pin 200 with a body portion 202, a head portion 220, and a tip portion 250. FIG. 8 shows a side view of pin 200. Body portion 202 is preferably a cylindrical solid with a diameter D8 and that extends along a central longitudinal axis 203. Pin body portion 202 has a first end 204 a second end 206. Head portion 220 is connected to or formed with first end 204. Tip portion 250 is connected to or formed with second end 206.

Referring now to FIGS. 9A and 9B, there is illustrated one embodiment of pin head portion 220 shaped like a collet. Head portion 220 has a collet element 222 with an inner surface 224 that surrounds an open region 234. Collet element 222 also has a conical or sloping outer surface 226 that tapers from a larger diameter D9 to smaller diameter, such as diameter D8 of pin body portion 202 (D8, D9 are shown in FIG. 8). Inner surface 226 is preferably cylindrical, but may have a square, hexagonal, octagonal, or cross-sectional shape of regular or irregular geometry. Collet element 222 has a plurality of slots or kerf cuts 228 extending through collet element 222 into open region 234, preferably radially towards central longitudinal axis 203. Kerf cuts 228 extend a predefined distance 230 longitudinally into collet element 222 towards first end 204 of body portion 202. Kerf cuts 228 divide collet element 222 into a plurality of pin collar segments 232. Each pin collar segment 232 is somewhat flexible and resilient, enabling collet element 222 to contract to a smaller diameter (e.g., diameter D6 of catch 150).

In some embodiments, collet element 222 expands to a larger diameter. For example, collet element 222 in one embodiment is on tip portion 250 of pin 200 with threads on head portion 220. As the user rotates pin 200 to advance it through first opening 130 and into second opening 130, collet element 222 engages a wedge-like structure within second opening 130, such as a protrusion into second opening 130 that expands in size towards outside body surface 139. Accordingly collar segments 232 of collet element 222 expand to engage inside surface 131 of second opening 130 and hold pin 200 in place.

In one embodiment, first end 204 of pin body portion 202 has a pin head recess 236 extending longitudinally into first end 204 of body portion 202 along central longitudinal axis 203. Pin head recess 236 preferably has a hexagonal shape to accept hex wrenches for turning pin 200. Other shapes of recess are acceptable, including a square, a slot, intersecting slots (e.g., for a Phillips screwdriver), a triangle, and other regular or irregular shapes configured to interacting with one of a standard, conventional tool or a custom-made tool designed for the shape of the recess.

In one embodiment, pin head recess 236 extends further into pin 200 and is optionally preceded by a threaded open region with a larger diameter than pin head recess 236. The threaded open region accepts a wedge-like insert that engages collet element 222. After the user advances pin 200 into second opening 130 to the desired position, a wedge-like insert is screwed into the threaded open region to force collar segments 232 radially outward and increase the diameter of collet element 222 to engage inside surface 123 of first opening 122 and hold pin 200 in place.

Turning now to FIG. 10, there is shown an embodiment of tip portion 250 sized to fit into second opening 130. Tip portion 250 has a tip diameter D10 that is preferably but not necessarily smaller than diameter D8 of pin body portion 202. When tip diameter D10 is smaller than diameter D8, pin 200 has a shoulder 254 between tip portion 250 and pin body portion 202. If diameter D2 of second opening 130 is smaller than diameter D8 of pin body portion 202, shoulder 254 abuts body 110 to prevent pin 200 from passing further into second opening 130. Tip portion 250 in one embodiment is a smooth cylinder. In other embodiments, tip portion 250 optionally has screw threads 252. Screw threads 252 facilitate advancement of pin 200 into first and second openings 122, 132, particularly when head portion 220 engages rim 150 of first opening 122. In another embodiment, shoulder 254 passes into a larger opening portion 136 of second opening 130, such as second opening 130 shown in FIG. 3A. In yet another embodiment, tip portion 250 has locking pins 225 as described above and shown in FIG. 3C.

Figure 11:
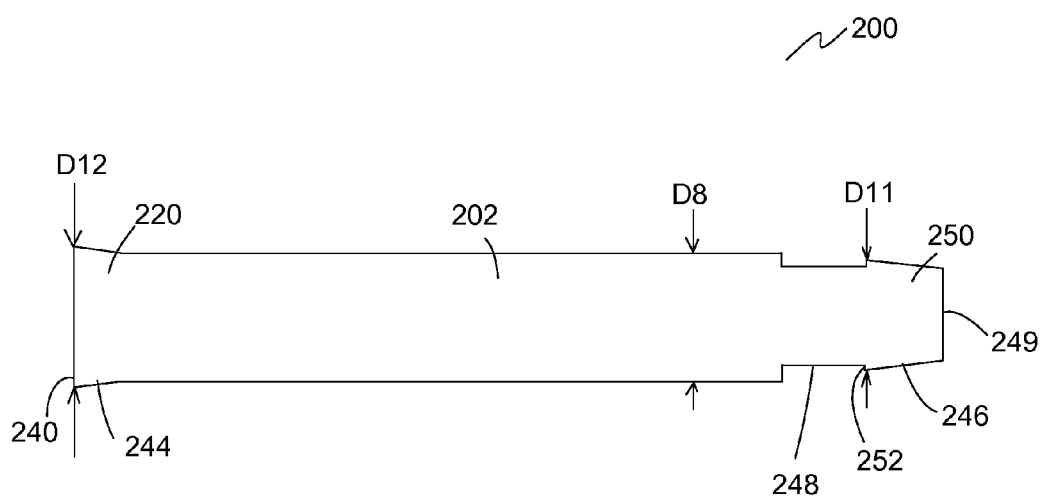
FIG. 11 illustrates a side elevation of another embodiment of the pin of the present invention.

Referring now to FIG. 11, there is shown another embodiment of pin 200 having an end-facing surface or catch surface 240 on head portion 220 and a second pin catch surface 242 on tip portion 250. A first sloped region 244 of increasing diameter extends from body portion 202 to end-facing surface 240. A diameter D12 at first catch surface 240 is preferably larger than diameter D8 of body portion 202. A second sloped region 246 of increasing diameter extends from tip end 249 to second pin catch surface 252. Second pin catch surface 252 is positioned in front of and adjacent a narrowed region 248 (i.e., in a direction from head portion 220 to tip portion 250). In this embodiment, a diameter D11 at second catch surface 242 is preferably equal to or smaller than diameter D8 of body portion 202. This embodiment of pin 200 is useful with body 110 having a collet member 160 around both first and second openings 122, 130 to engage first and second catch surfaces 240, 242, respectively. In other embodiments, pin 200 has either catch surface 240 or second pin catch surface 242 and body 110 has collet member 160 around the corresponding first or second opening 122, 130.

Pin 200 is preferably cylindrical, but may have other cross-sectional shapes, such as rectangular, square, or other geometries as appropriate for the method of insertion or advancement through first opening 122 and into second opening 130. For example, an embodiment of pin 200 could have a rectangular cross-sectional shape when it is merely pressed without rotation through first opening 122 and into second opening 130.

Figure 12A:
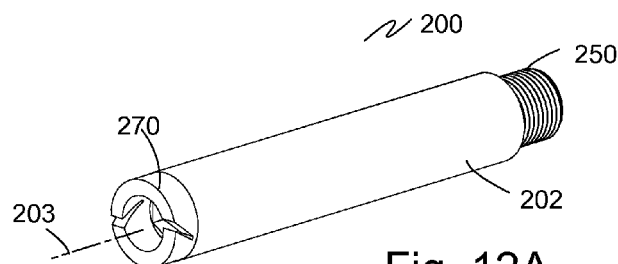
FIG. 12A illustrates a perspective view of another embodiment of the pin of the present invention showing a locking head.
Figure 12B:
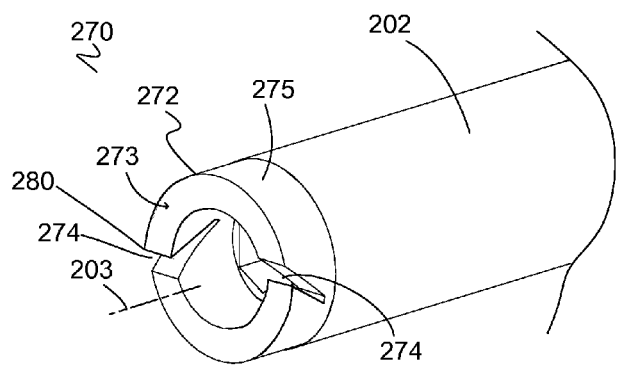
Figure 12C:
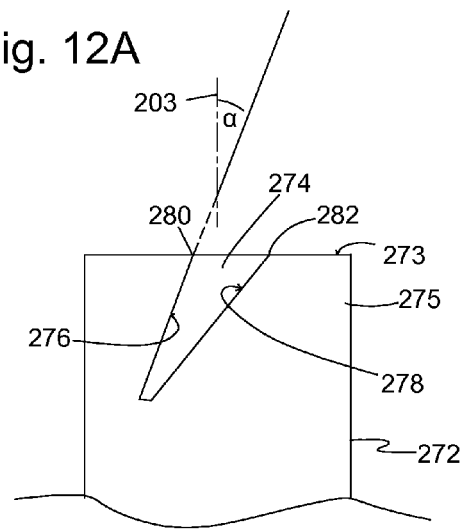
FIG. 12C illustrates a side view of the head portion of the pin of FIG. 12a in an upright orientation.

Turning now to FIG. 12a, there is shown another embodiment of pin 200 with a locking head 270, cylindrical body portion 202, and tip portion 250. Shown enlarged in FIG. 12B, locking head 270 has a substantially cylindrical collet element 272 with an outside surface 275, an end surface 273, and one or more kerf cuts 274. Kerf cut(s) 274 extending into collet element 272 through end surface 273 at a predefined angle α transverse to central longitudinal axis 203. As illustrated in FIG. 12C, which shows a side view of locking head 270 in an upright orientation, kerf cut 274 has an angle α with respect to central longitudinal axis 203 of pin 200. Angle α is preferably about thirty degrees, but may be between about fifteen and about seventy-five degrees with respect to central longitudinal axis 203. Due to angle α of kerf cut(s) 274, collet element 272 has inward face 276 that faces somewhat towards body portion 202 and defines angle α. Collet element 272 also has outward face 278, which faces somewhat away from pin body portion 202. When pin 200 is oriented vertically with locking head 270 at the top of pin 200 as shown in FIG. 12C, inward face 276 faces downward and outward face 278 faces upward.

Figure 12D:
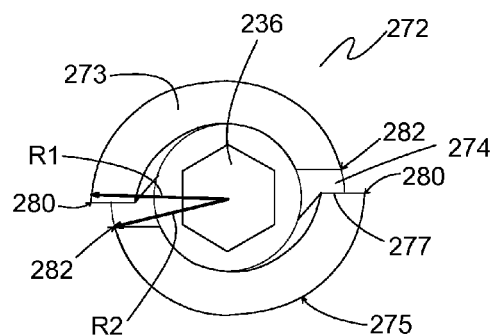

Referring to FIGS. 12C and 12D, inward face 276 has a tip 277 at the intersection of end surface 273 and inward face 276. A first outside corner 280 of tip 277 is defined at the intersection of inward face 276, end surface 273, and outside surface 275 of collet element 272. A second outside corner 282 is defined at the intersection of outward face 276, end surface 273, and outside surface 275 of collet element 272.

As shown in FIG. 12D, collet element 272 of locking head 270 is splayed open at kerf cuts 274 during manufacture where first outside corner 280 of collet element 272 has a radius R1 that is greater than a radius R2 of the nearby second outside corner 282 that is opposite of kerf cut 274. One method of manufacture is to use a mandrel during heat treatment to bend tip 277. After heat treatment is complete, first outside corner 280 remains pushed outward by about 0.001" as compared to first inside corner 282, but may be compressed inward by a force acting radially inward against collet element 272. Such a force is applied when pin 200 is turned into a restricted opening with outside surface 275 of collet element 272 contacting the inside surface of the opening.

Kerf cuts 274 are angled so that first outside corner 280 catches or cuts into an inside surface of an opening when pin 200 is rotated against tip 277 (e.g., to back pin 200 out of the opening). In other words, when tip portion 250 has right-hand threads 252, kerf cut 274 creates first outside corner 280 where it catches against inside surface of an opening when pin is rotated counter-clockwise when looking at end surface 273 of collet element 272. When pin tip portion 250 has left-hand threads 252, kerf cut 274 create first outside corner 280 where it catches against the inside surface of an opening when pin is rotated clockwise. Thus, pin 200 with locking head 270 would not require a catch 150 on the inside surface 123 of first opening 122 for pin 200 to be locked in place with body 110 because first outside corner(s) 280 engages or cuts into inside surface 123 of the first opening 122 to prevent pin 200 from backing out of first opening 122. As with other embodiments, pin 200 with locking head 270 optionally has pin head recess 236 to enable a user to rotate pin 200 with a tool. Also, collet element 272 in some embodiments gradually increases in diameter as it extends towards end surface 273.

Figure 15:
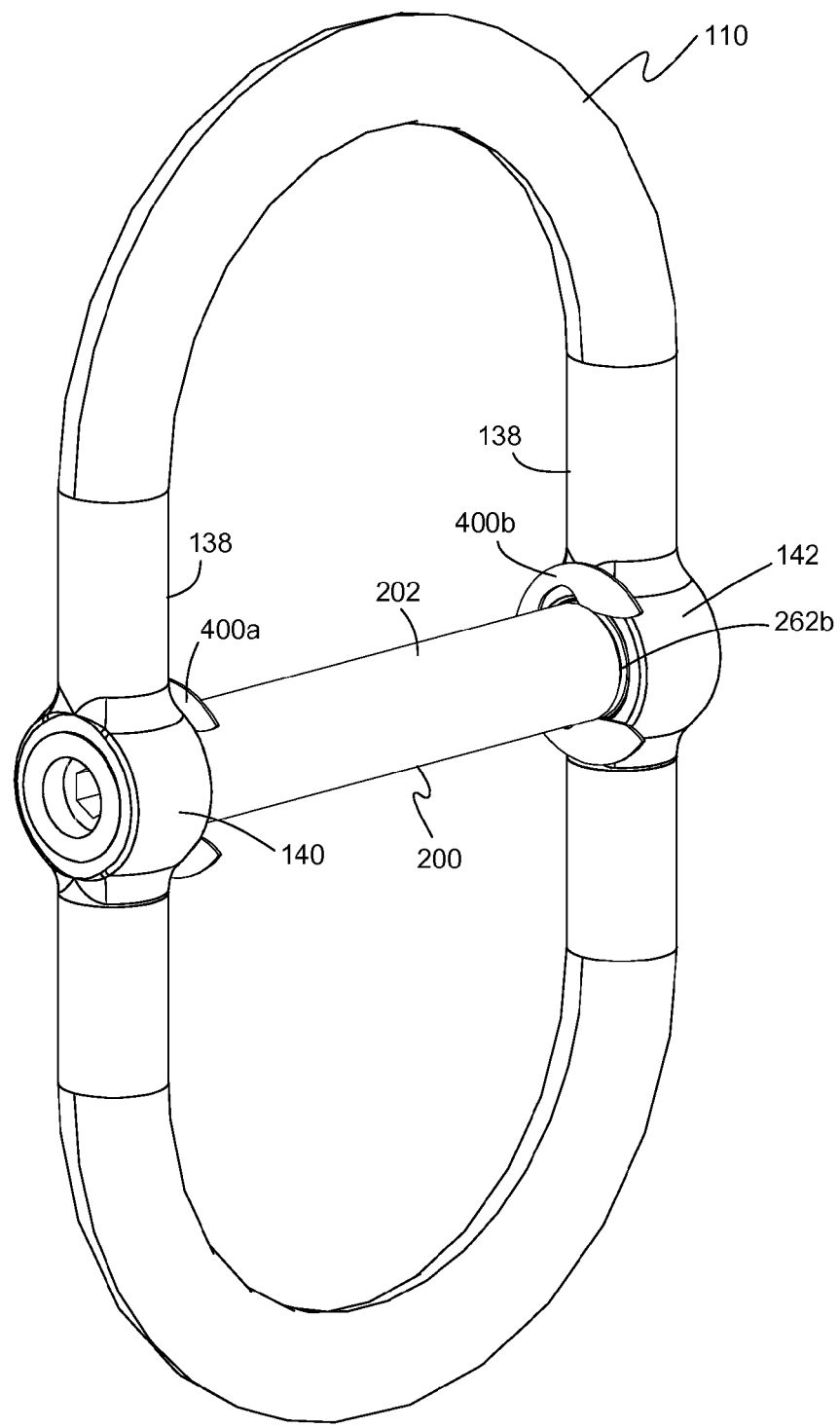
FIG. 15 is a perspective view of the shackle and pin of FIG. 14 showing locking rings installed on slots in the pin body portion.
Figure 16:
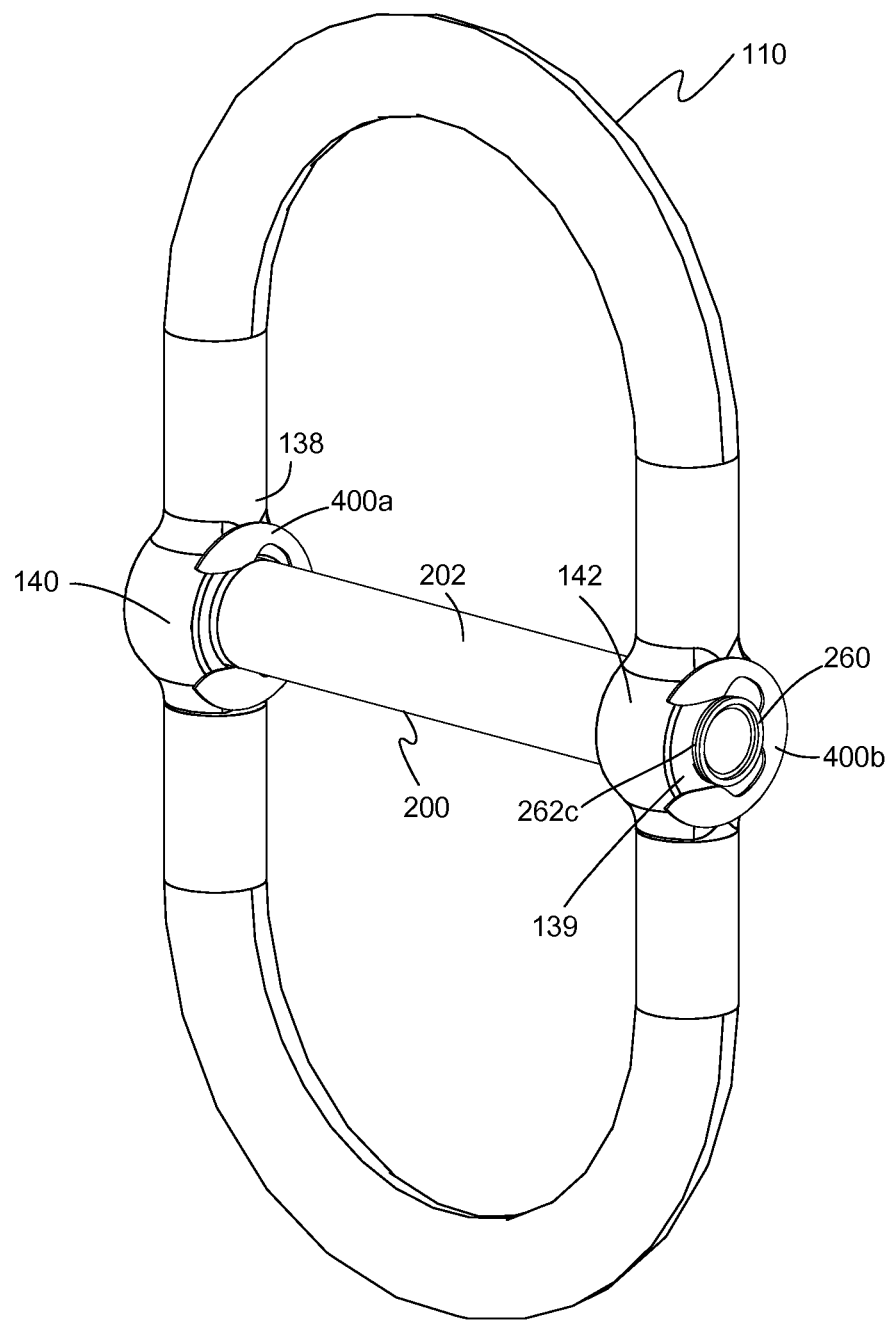
FIG. 16 is a right-side perspective view of the shackle and pin of FIG. 13D showing locking rings installed in a slot in the pin body portion and in a slot in the pin tip portion.
Figure 18:
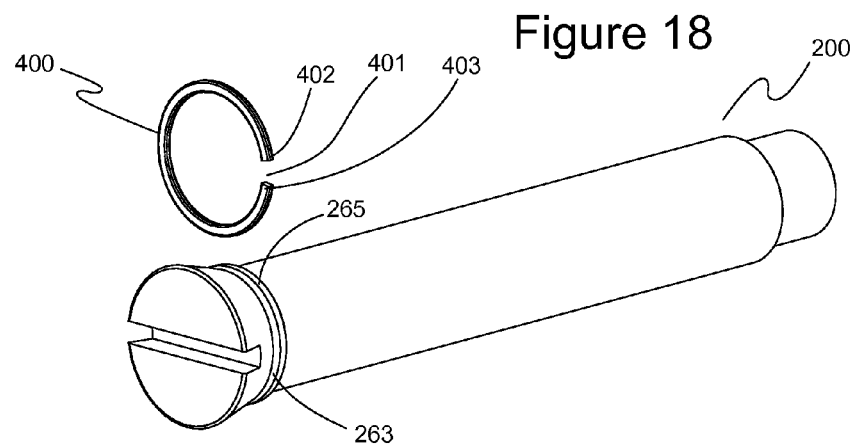
FIG. 18 is a perspective view of the pin of FIG. 17 and one embodiment of a locking ring that can be installed in the slot in the head portion.

Referring now to FIG. 13A-13D, side views illustrates additional embodiments of pin 200 for use with one or more locking rings 400, which is shown, for example, in FIGS. 15-16 and 18. As with embodiments above, pin 200 extends along central longitudinal axis 203 and has pin body portion 202, pin tip portion 250, and head portion 220. Optionally, pin 200 has pin head recess 236 (shown in FIG. 12D) as discussed above for advancing pin 200 into an opening. Pin tip portion 250 may or may not have threads 252, where threads 252 have a thread major diameter and a thread minor diameter. Embodiments of pin 200 and retaining ring 400 may be made of metal (e.g., stainless steel or spring steel), plastic, or other materials, depending on the desired strength, corrosion resistance, weight, and other properties required for the intended use.

Figure 13A:
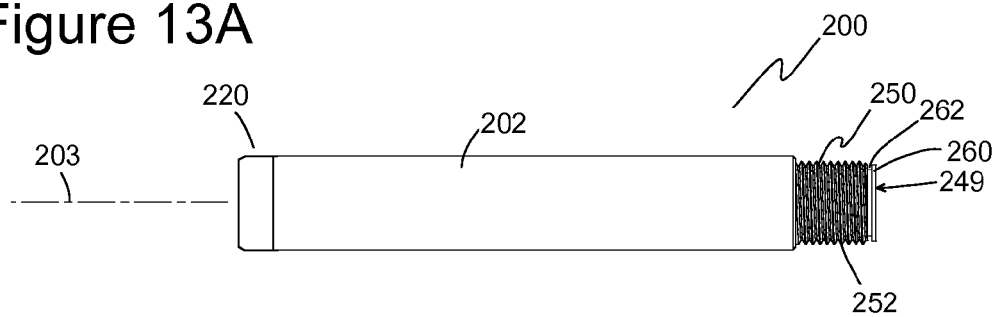
FIG. 13A illustrates a side view of another embodiment of a pin of the present invention showing a flange and slot on the tip portion for use with a locking ring.

FIG. 13A shows pin 200 with pin tip portion 250 having a flange 260 extending radially and positioned adjacent tip end 249. In one embodiment, a tip slot 262 extends circumferentially around pin tip portion 250 partially or completely and is positioned between flange 260 and threads 252. It is contemplated that tip slot 262 may comprise two or more flats, recesses, or regions of reduced diameter adjacent flange 260. Pin 200 is sized so that flange 260 and tip slot 262 extend through an opening when pin tip portion 250 is threaded into the opening. Accordingly, a locking ring 400 (shown in FIGS. 15-16) can be installed on pin tip portion 250 at tip slot 262. Locking ring 400 can be, for example, a circlip, E-clip, C-clip, retaining ring, retaining snap ring, locking ring, split ring, or the like. Locking ring 400 can expand to be installed on pin tip portion 250 adjacent flange 260, such as in tip slot 262, and resiliently resume a smaller configuration to seat itself in tip slot 262. After threading or otherwise advancing pin 200 into an opening to the extent that flange 260 extends beyond the opening, installing locking ring 400 on pin tip portion 250 adjacent flange 260 prevents pin 200 from backing through the opening inadvertently or intentionally because locking ring 400 is a block between flange 260 and the structure surrounding the opening (e.g., hub 142) and therefore prevents flange 260 from passing through the opening. Thus, assuming pin body portion 202 prevents further advancement of pin 200 through the opening, pin tip portion 250 is locked in the opening until locking ring 400 is removed.

Figure 13B:
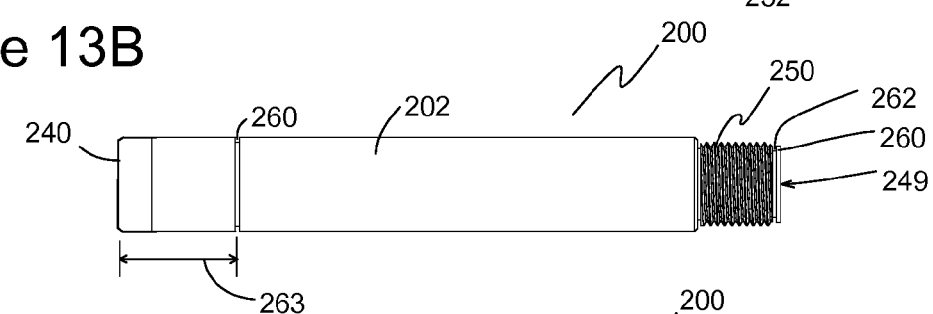
FIG. 13B illustrates a side view of another embodiment of a pin of the present invention showing a slot on the pin body portion and a flange and slot at the pin tip portion for use with one or more locking rings.

Referring now to FIG. 13B, another embodiment of pin 200 is shown with a body slot 262a on pin body portion 202 spaced from head portion 220, where body slot 262a is located a predefined distance 263 from end-facing surface 240 of pin head 220. Here, body slot 262a is positioned on pin body portion 202 so it is positioned adjacent inside face 154 of hub 140 (shown in FIG. 4) or similar structure surrounding an opening when pin 200 extends through the opening (e.g. first opening 122 of FIG. 4). Similar to the embodiment of pin 200 shown in FIG. 13A, locking ring 400 installed on pin 200 at body slot 262a after inserting pin 200 through an opening (e.g., first opening 122) prevents pin 200 from being removed back through the opening because locking ring 400 engages inside face 154 and pin 200 to prevent its removal. As an option for added locking assurance, pin 200 also includes flange 260 and tip slot 262 at tip end 249 of pin tip portion 250 as discussed above for the embodiment of pin 200 shown in FIG. 13A. In one embodiment, head portion 220 has a flat end-facing surface 240 and an overall profile shape that can be recessed within an opening, such as first side aperture 122 discussed above. This design of head portion 220 prevents snags when pin 200 is used with a lanyard or the like.

Figure 13C:
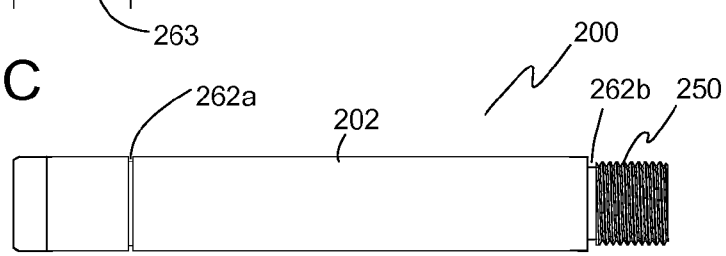
FIG. 13C illustrates a side view of another embodiment of a pin of the present invention showing first and second slots on the pin body portion for use with one or more locking rings.

Referring now to FIG. 13C, another embodiment of pin 200 is shown with a body slot 262a and a second body slot 262b along pin body portion 202. Here, both of body slot 262a and second body slot 262b are positioned to be adjacent the face (e.g., inside surface 138) of an corresponding opening when pin 200 extends through two spaced-apart openings, such as first and second openings 122, 132 through hubs 140, 142, respectively of shackle body 110 shown in FIG. 2A. Thus, a locking ring 400 installed on body slot 262a prevents removal of pin 200 in one direction and another locking ring 400 installed on second body slot 262b prevents removal of pin 200 in the opposite direction. Since locking rings 400 are positioned on along the inside surface 138 of shackle body 110 or other structure, locking rings 400 are protected from damage and accidental removal by shearing, impact, or other cause. As an option for added locking assurance, pin 200 may also include flange 260 and tip slot 262 on pin tip portion 250 as discussed above for the embodiment of pin 200 shown in FIG. 13A.

Figure 13D:
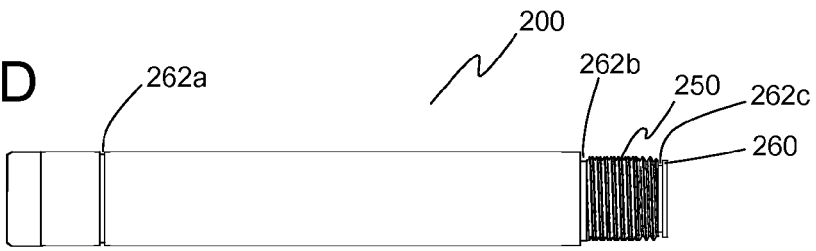
FIG. 13D illustrates a side view of another embodiment of a pin of the present invention showing first and second slots on the pin body portion and a flange and slot on the pin tip portion for use with one or more locking rings.

Referring now to FIG. 13D, yet another embodiment of pin 200 is shown with body slot 262a and second body slot 262b on pin body portion 202, and flange 260 and tip slot 262 on pin tip portion 250. By combining features of the pins 200 discussed above with reference to FIGS. 13A-13C, pin 200 in the embodiment shown in FIG. 13D allows the user flexibility in selecting an appropriate location for locking ring 400.

Figure 14:
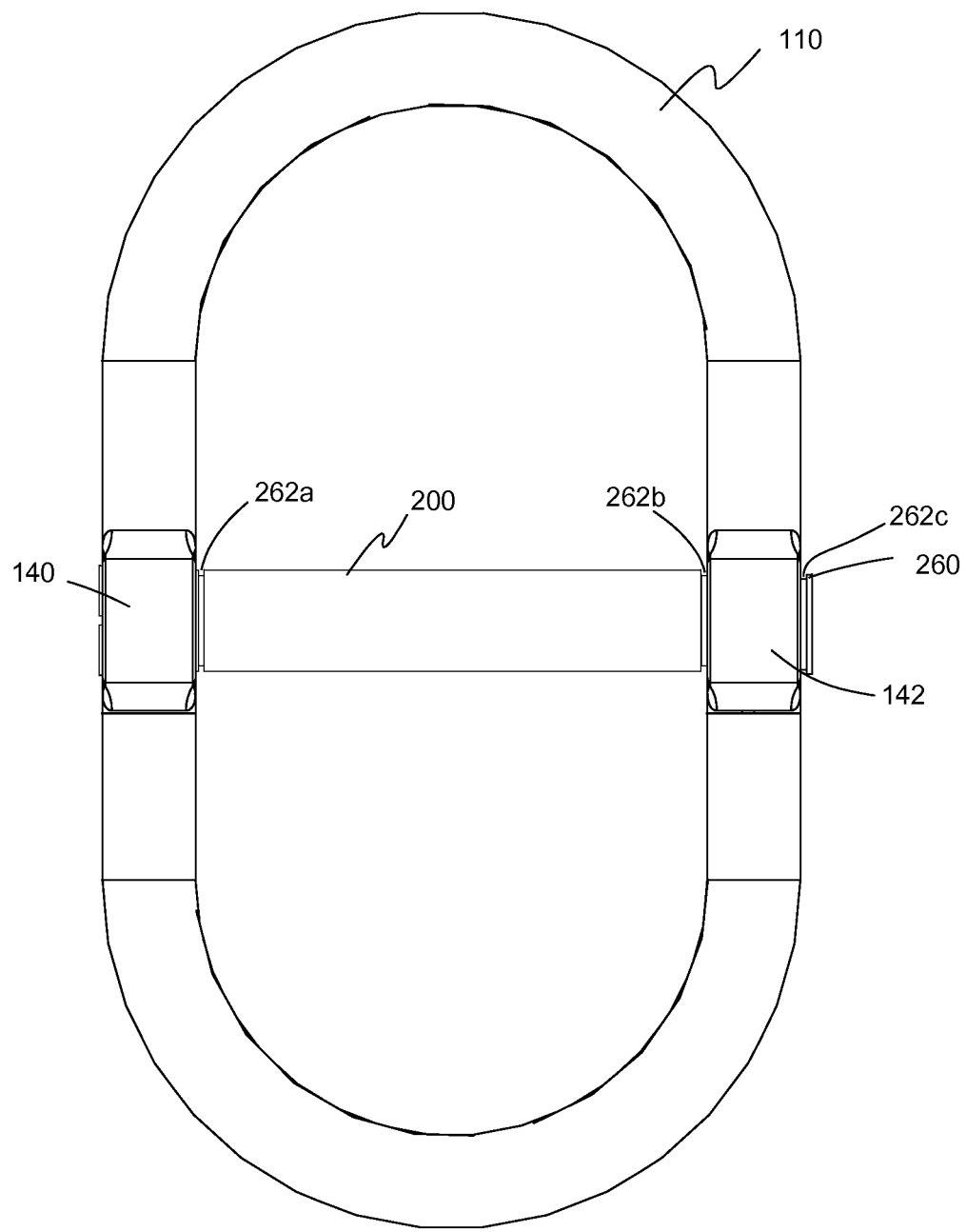
FIG. 14 is a front elevational view of a shackle body with the pin of FIG. 13D installed.

FIG. 14 illustrates a front view of shackle body 110 with pin 200 of FIG. 13D installed through openings in hubs 140, 142. The user may install locking ring 400 on any one or more of body slot 262a, second body slot 262b, and/or tip slot 262 to prevent removal of pin 200.

Referring now to FIG. 15, a left perspective view shows pin 200 discussed above with reference to FIG. 13C or 13D shown installed in shackle body 110. A locking ring 400 is installed on pin 200 at body slot 262a (shown in FIG. 14) adjacent inside surface 138 along first hub 140. Another locking ring 400 is installed on pin 200 at second body slot 262b adjacent inside surface 138 along second hub 142.

Referring now to FIG. 16, a right perspective view shows an embodiment of pin 200 as discussed above with reference to FIG. 13B shown installed in shackle body 110. A locking ring 400 is installed on pin 200 at body slot 262a adjacent inside surface 138 along first hub 140. Another locking ring 400 is installed on pin tip portion 250 at tip slot 262 positioned between flange 260 and outside body surface 139 along second hub 142. As shown in FIG. 16, locking rings 400 prevent pin 200 from being removed or backed out of shackle body 110, where pin head portion 220 (not visible) and/or pin body portion 202 prevent further advancement of pin 200 through shackle body 110 in the opposite direction.

Figure 17:
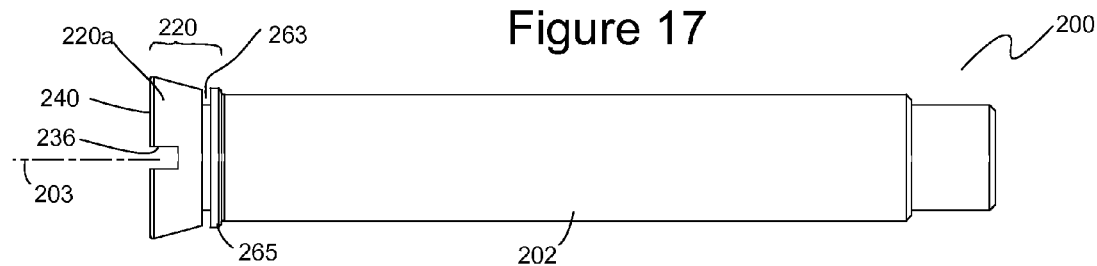
FIG. 17 is an elevational view showing another embodiment of a pin of the present invention with a slot in the head portion.

Referring now to FIG. 17, an elevational view shows another embodiment of pin 200 with a head slot 263 in head portion 220. In one embodiment, head slot 263 extends circumferentially about central longitudinal axis 203 and partially or completely around head portion 220. For example, head slot 263 is an annular groove with a rounded or rectangular profile. Head slot 263 has a radial slot depth 264 sized to receive an expandable retaining ring 400, such as an external snap ring or C-type circlip, with retaining ring 400 extending radially beyond head portion 220 immediately adjacent head slot 263 when retaining ring 400 is seated in head slot 263. In one embodiment, head portion 220, or a portion 220a thereof, is tapered between end-facing surface 240 and pin body portion 202. In one embodiment, pin head recess 236 is a slot suitable for use with a flat-head screwdriver. Other configurations of pin head recess 236 are acceptable. In one embodiment, tip portion 250 is threaded for threadably advancing pin 200 into/through first side and second side apertures 122, 130 of shackle body 110 (see, e.g., threaded tip portion 250 of FIG. 10).

FIG. 18 shows a perspective view of pin 200 of FIG. 17 and one embodiment of retaining ring 400 of the snap ring type shown separate from pin 200. Retaining ring 400 can be assembled on pin 200 and seated in head slot 263. For example, retaining ring 400 is expanded as needed to fit over and slide along body portion 202 and pin head shoulder 265 (if present). Resiliency then returns retaining ring 400 to its resting size as retaining ring 400 occupies head slot 263. Due to a gap 401 in the circumferential path of retaining ring 400, retaining ring 400 may be circumferentially compressed in size with ring ends 402, 403 forced towards each other.

Figure 19:
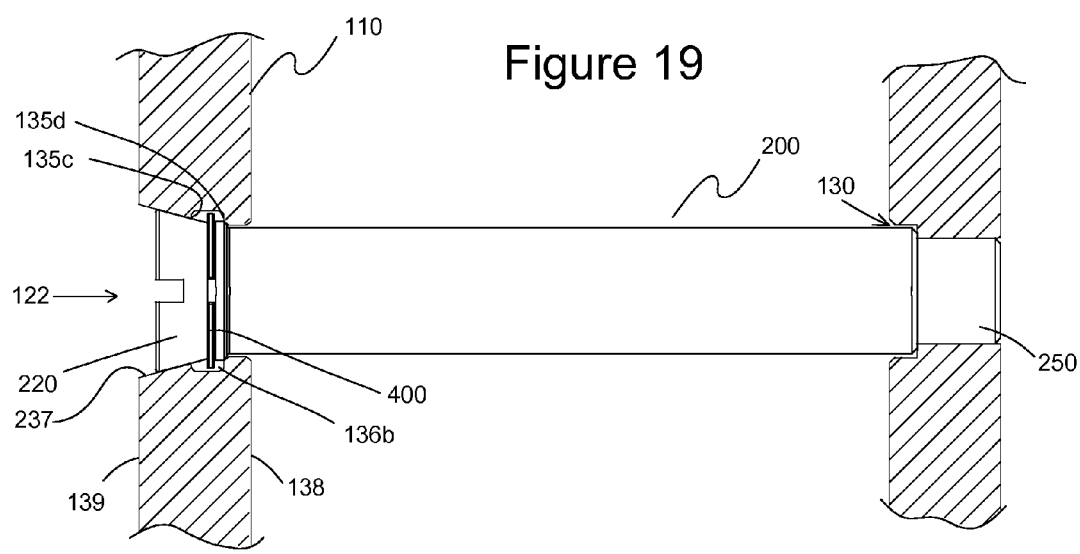
FIG. 19 is an elevational view of the pin and locking ring of FIG. 18 and sections of hubs at first and second side portions of a shackle body, where the pin is installed through openings in the hubs and retained in place with the locking ring.

Referring now to FIG. 19, a cross section of shackle body 110 is illustrated with pin 200 installed in first opening 122 and second opening 130. Pin tip portion 250 is received in second opening 130 and head portion 220 is received in first opening 122. Similar to second opening 130 as discussed above with reference to FIG. 3C, In this embodiment, a first opening recess 136b, such as a groove or slot, is located is an intermediate portion of first opening 122, such as about midway between inside body surface 138 and outside body surface 139. First opening recess 136b in one embodiment extends around the perimeter of first opening 122, such as an annular slot with a rounded or square profile. In other embodiments, first opening recess 136b includes one or more slots that are machined or formed into a portion or portions of inside surface 123 of first opening 122. Inner recess wall 135c and outer recess wall 135d define catch and/or stop surfaces within first opening recess 136b.

With retaining ring 400 that is expandable, retaining ring 400 compresses into head slot 263 as is engages sloped entrance face(s) 237 to first opening recess 136b, then expands into first opening recess 137b as it passes outer recess wall 135c. By occupying both head slot 263 and first opening recess 137b, retaining ring 400 restricts movement of pin 200 into or out of first opening 122. Sloped entrance face(s) 237 also prevents further advancement of pin 200 by engaging tapered head portion 220. Thus, in one embodiment, first opening recess 137b does not need inner recess wall 135d and first opening recess 137b optionally extends axially to inside body surface 138.

Figure 20A:
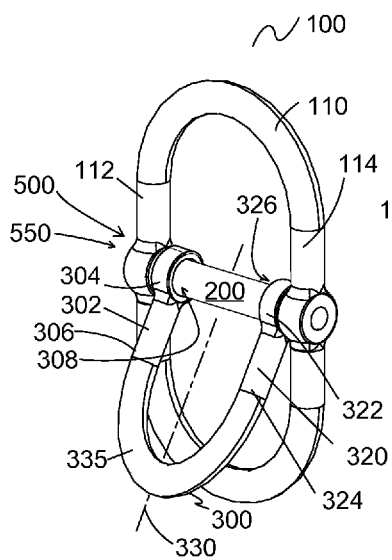
FIG. 20A illustrates a perspective view of another embodiment of a shackle assembly of the present invention with a pivoting additional body member.

Turning now to FIG. 20A, another embodiment is shown of shackle assembly 100 with body 110, pin 200, and an optional second body member 300. Second body member 300 has a longitudinal first side 302 with a first end 304, a second end 306, and a first opening 308 extending transversely through first end 304. A longitudinal second side 320 is positioned opposite and aligned substantially parallel to first side 302. Second side has a first end 322, a second end 324, and a second opening 326 extending transversely through first end 322. Preferably, both first opening 308 and second opening 326 are axially-aligned through-openings sized and configured to receive pin 200. In another embodiment, second opening 326 extends only partially through first end 322 and may be threaded to receive threads 252 of pin 200, such as when second body member 300 is configured with second opening 326 positioned outside of body 110. First and second sides 302, 304 are preferably straight cylindrical segments that are substantially parallel to one another. In another embodiment, first and second sides 302, 304 are curved and/or angled with respect to a central longitudinal axis 330.

A second body member end portion 335 extends between second end 306 of first side 302 and second end 324 of second side 320, preferably along an arc or curve, but optionally along a line or lines. In some embodiments, second body member end portion 335 is merely a plane of intersection between curved or angled embodiments of first and second sides 302, 304. Second body member 300 in one embodiment is configured with first ends 304, 322 of first and second sides 322, 324, respectively, disposed between first side portion 112 and second side portion 114 of body 110 (i.e., inside of body 110). In another embodiment, one or both of first ends 304, 322 of second body member 300 are positioned outside of first side portion 112 and/or second side portion 114 of body 110. Preferably, second body member 300 swivels or pivots about pin 200.

Figure 20B:
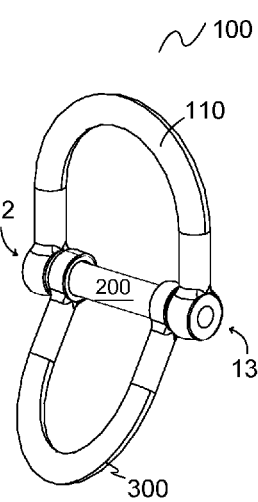
FIG. 20B illustrates a perspective view of another embodiment of a shackle assembly of the present invention with a U-shaped body and a pivoting additional body member.

As shown in FIG. 20B, there is shown an example of body 110 with a U-shaped structure that defines an open geometry. Pin 200 extends through first opening 122 and second opening 130. Second body member 300 is optionally included. Shackle assembly 100 has a first retaining structure 500 on body 110 and a second retaining structure 550 on pin 200, exemplary components of which are better illustrated in FIGS. 3-12. First and second retaining structures 500, 550 together prevent pin from being removed from body 110. First retaining structure is not a thread or nut, but means includes an inside surface of an opening, a rim with a catch surface that extends into the opening; a collet member, and an interface between a larger opening and a smaller opening. First retaining structure 500 includes (i) an inside surface of an opening, (ii) a rim with a catch and/or stop surface 166a that extends into the opening; (iii) a collet member having a plurality of collet member segments disposed around an opening, where the collet member is capable of expanding in response to engagement with the head portion of the pin, and (iv) a stop surface defined by an interface between a larger opening portion and a smaller opening portion of one of the first side opening and the second side opening.

For the purpose of shackle assembly 100 shown in FIG. 20A, second retaining structure 550 is not a screw thread, cotter pin, retaining ring, or nut, but means an end-facing surface 240 on pin 200, a collet element 272 that can change between a first diameter and a second diameter in response to engagement with the inside surface of an opening, a locking pin 225, a sloped region 244 of increasing diameter on pin 200, and the interface between a region of larger diameter and a region of smaller diameter on pin 200. Examples of second retaining structure 550 include (1) the head portion 220 having a collet element 272 with a plurality of pin collet segments 232 disposed around an open region 234 and compressible to a smaller diameter in response to engagement with the inside surface of an opening, (2) the head portion 220 comprising an end-facing surface 240 configured to engage a stop surface on the body to prevent the pin 200 from being removed from the body, (3) the head portion 220 having a sloped region 244 of increasing diameter, (4) at least one locking pin 225 biased to extend from the tip portion 250 into the larger opening portion and configured to engage the stop surface on the body, and (5) the head portion 220 having a collet element 272 with an outside surface 275 and at least one kerf cut 274 extending through the collet element 272 at an angle α transverse to the central longitudinal axis 203, where the kerf cut 274 defines an outwardly sloped face 278 and an inwardly sloped face 276 with a tip 277, where the tip 277 has a tip outside radius R1 greater than the outside surface R2 at the outwardly sloped face 278, and where the tip 280 is radially compressible to reduce the tip outside radius R1 by engaging the inside surface of an opening.

Figure 20C:
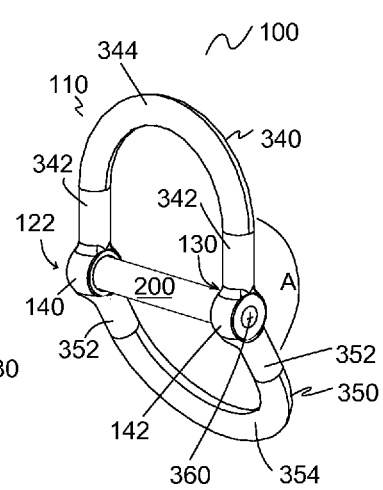
FIG. 20C illustrates a perspective view of another embodiment of a shackle assembly of the present invention showing an angled body.

Turning now to FIG. 20C, another embodiment of body 110 is shown where body 110 is angled and has a first body member 340 and a second body member 350. First body member 340 has a pair of first leg portions 342 extending between first end portion 344 and hubs 140, 142. Second body member 350 has a pair of second leg portions 352 extending between second end portion 354 and hubs 140, 142. First body member 340 defines an angle A with second body member 350, where angle A is between 90 and 180 degrees and preferably about 150 degrees. As with other embodiments, pin 200 passes through first and second openings 122, 130 of body 110. In one embodiment, first and second openings 122, 130 are located at a vertex 360 of angle A where first body member 340 and second body member 350 meet, but is not limited to this location. The angle may optionally be imparted along first leg portions 342 or along second leg portions 352.

In use, first and second retaining structures 500, 550 between pin 200 and body 110 allows pin 200 to be retained by body 110. For example, head portion 220 of pin 200 having a collet element 270 in combination with a stop surface of interface 151 are used to retain pin 200 in body 110. By advancing pin 200 through first opening 122 towards and into second opening 130 of body 110 (shown in FIG. 2A and in more detail in FIGS. 5-6), collet element 222 is squeezed against radially inner surface 150a of catch 150, causing collet element 222 to contract to a slightly smaller diameter D6 of catch 150. When head portion 220 proceeds past catch 150, collet element 222 is no longer restricted to diameter D6 of catch 150. Thus, as tension from catch 150 against collet element 222 is released, collet element 222 expands back to diameter D9, with interface 151 preventing pin 200 from passing back through first side opening 122.

Another example of second retaining structure 550 is pin 200 having one or more locking pins 225 and second opening 130 having larger opening portion 136 and smaller opening portion 134 as described above. The user advances pin 200 through first opening 122 and into second opening 130. When not restricted by their surroundings, locking pins 225 are biased to extend from tip portion 250 of pin 200. As tip portion 250 passes through smaller opening portion 134, locking pin(s) 225 are compressed into tip portion 250 by the reduced size of smaller opening 134. When locking pin(s) 225 pass smaller opening portion 134 into larger opening portion 136, they extend through tip portion 250 and engage interface 135 to restrict movement of pin 200 into and/or out of second opening 130.

An example of first retaining structure 500 is a collet member 160 around first and/or second openings 122, 130 and one or more catch surfaces 240, 242 on pin 200. Another example of first retaining structure 500 is a collet member 160 with collet segments 162 disposed around first opening 122 and/or second opening 130. The engagement of collet member 160 against pin 200 locks pin 200 with body 110. Collet member 160 optionally has catch 166 with interface 166a as an additional first retaining structure 500 to lock pin 200 with body 110.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A combination of a shackle with a pin and a locking ring comprising:
 a shackle body with a closed geometry defining a primary opening therethrough and comprising:
  a first side member with a first side aperture extending transversely therethrough;
  a second side member spaced apart from the first side member and having a second side aperture extending transversely at least partially through the second side member, the second side aperture positioned opposite the first side aperture and axially aligned with the first side aperture; and
  end portions extending between and connecting the first side member and the second side member;
 a pin having a body portion longitudinally extending between a head portion and a tip portion, the tip portion sized to be received in the second side aperture and the head portion sized to be received in the first side aperture, wherein the pin defines an annular slot extending at least partially around the pin; and
 an expandable retaining ring configured to be installed on the pin and occupy the annular slot;
 wherein the expandable retaining ring engages the pin and the shackle body to prevent removal of the pin from the shackle body when the pin is installed in the shackle body with the expandable retaining ring occupying the annular slot.

2. The combination of claim 1, wherein the annular slot is a tip slot extending at least partially around the tip portion, wherein the tip slot defines a flange located between the tip end and the tip slot, the flange protruding radially about the longitudinal axis from the tip portion and having a flange outer diameter greater than the slot diameter and no greater than the tip diameter; and
 wherein the tip slot and the flange extend through the second side aperture when the pin is installed in the shackle body.

3. The combination of claim 2, wherein the tip portion defines a plurality of threads on the tip portion between the body portion and the tip slot, wherein the tip diameter is a major thread diameter.

4. The fastener of claim 3, wherein the flange outer diameter is substantially equal to a minor thread diameter of the plurality of threads.

5. The combination of claim 1, wherein the annular slot is a tip slot extending at least partially around the tip portion;
 wherein the second side aperture defines a second opening recess having at least one recess wall located between an inside body surface and an outside body surface of the second side member; and
 wherein the expandable retaining ring is constructed to be installed in the tip slot and positioned to engage the at least one recess wall to prevent removal of the pin from the shackle body when the pin is installed in the shackle body with the tip portion received in the second side aperture and the head portion is received in the first side aperture.

6. The combination of claim 1, wherein the annular slot is a body slot extending at least partially around the body portion, wherein the body slot is adjacent an inside body surface of the first side member when the pin is installed in the shackle body with the tip portion received in the second side aperture and the head portion is received in the first side aperture.

7. A combination of a shackle with a pin and a locking ring comprising:
 a shackle having a rigid shackle body with a closed geometry defining a primary opening therethrough, the rigid shackle body comprising:
  a first side member with a first side aperture extending transversely therethrough, the first side aperture defining a first opening recess having at least one recess wall and located between an inside body surface and an outside body surface of the first side member;

a second side member spaced apart from the first side member and having a second side aperture extending transversely at least partially through the second side member, the second side aperture positioned opposite the first side aperture and axially aligned with the first side aperture; and end portions extending between and connecting the first side member and the second side member;

a pin comprising pin body portion extending longitudinally between a head portion and a tip portion, the head portion defining an annular head slot with a slot diameter, wherein the pin body is sized to be received through the first side aperture with the tip portion received in the second side aperture; and a retaining ring expandable for installation on the pin and sized to be received in the annular head slot;

wherein when the pin is installed in the rigid shackle body with the tip portion received in the second side aperture and the head received in the first side aperture, and the retaining ring is installed on the pin in the annular head slot, the retaining ring is positioned to engage the recess wall to prevent removal of the pin.

8. The combination of claim 7, wherein the first side aperture further defines a sloped entrance face between the outside body surface and the first opening recess.

9. The fastener of claim 8, wherein the pin body portion defines two or more slots distributed axially along the body portion.

10. The combination of claim 7, wherein the second side aperture and the tip portion are threaded.

11. The combination of claim 7, wherein the first opening recess is an annular groove in an inside surface of the first side aperture.

12. A locking fastener comprising:

a pin body portion extending longitudinally between a head portion and a tip portion, the tip portion having a tip end and a tip diameter wherein the fastener defines at least one of (i) a body slot in the pin body portion and having a slot diameter less than a pin body diameter, where the annular body slot is spaced from the head portion, (ii) a tip slot adjacent in the tip portion and defining a flange adjacent the tip end wherein the flange has a flange outer diameter greater than a tip slot diameter and no greater than the tip diameter, and (iii) a head slot in the head portion.

13. The locking fastener of claim 12 further comprising:

an expandable locking ring having an inner diameter sized for installation on one of the annular body slot, the tip slot, or the head slot, wherein when installed on the tip slot, the body slot, or the head slot, the expandable locking ring extends radially beyond the pin body diameter.

14. The fastener of claim 12, wherein the fastener defines an tip slot and wherein the tip portion further defines a plurality of threads between the tip slot and the pin body portion, wherein the tip diameter is a minor thread diameter.

15. The fastener of claim 14, wherein the flange outer diameter is substantially equal to a minor thread diameter of the plurality of threads.

16. The fastener of claim 12 wherein the body slot, the tip slot, and/or the head slot is selected from the group consisting of an annular groove, two or more recesses arranged circumferentially; and two or more flats arranged circumferentially.

17. The fastener of claim 12, wherein the fastener further defines an additional body slot in the pin body portion having an additional body slot diameter smaller than the pin body diameter, the additional body slot positioned adjacent the tip portion.

* * * * *